United States Patent
Dong et al.

(10) Patent No.: US 11,495,195 B2
(45) Date of Patent: Nov. 8, 2022

(54) APPARATUS AND METHOD FOR DATA TRANSFER IN DISPLAY IMAGES UNTO LED PANELS

(71) Applicant: AlphaScale Technologies, Inc., Hillsborough, CA (US)

(72) Inventors: Qi Dong, Changzhou (CN); Minglang Wang, Wuxi (CN); Gufeng Xi, Hillsborough, CA (US)

(73) Assignee: ALPHASCALE TECHNOLOGIES, INC., Hillsborough, CA (US)

( * ) Notice: Subject to any disclaimer, the term of this patent is extended or adjusted under 35 U.S.C. 154(b) by 0 days.

(21) Appl. No.: 16/945,093

(22) Filed: Jul. 31, 2020

(65) Prior Publication Data
US 2022/0036865 A1     Feb. 3, 2022

(51) Int. Cl.
| G09G 5/399 | (2006.01) |
| G09G 5/393 | (2006.01) |
| G09G 5/395 | (2006.01) |
| G09G 3/32  | (2016.01) |
| G09G 3/20  | (2006.01) |

(52) U.S. Cl.
CPC ........... *G09G 5/399* (2013.01); *G09G 3/2003* (2013.01); *G09G 3/32* (2013.01); *G09G 5/393* (2013.01); *G09G 5/395* (2013.01); *G09G 2310/08* (2013.01); *G09G 2360/127* (2013.01); *G09G 2360/18* (2013.01); *G09G 2370/02* (2013.01)

(58) Field of Classification Search
CPC ........ G09G 5/399; G09G 3/32; G09G 3/2003; G09G 5/395; G09G 5/393; G09G 2370/02; G09G 2360/18; G09G 2310/08; G09G 2360/127; G09G 2370/00; G06F 3/1431; G06F 3/1446
See application file for complete search history.

(56) References Cited

U.S. PATENT DOCUMENTS

| 5,347,322 A | 9/1994 | Levine et al. |
| 5,812,105 A | 9/1998 | Van de Ven |
(Continued)

FOREIGN PATENT DOCUMENTS

KR     10 217 0367 B1 *  4/2019    ......... H04N 21/4402

OTHER PUBLICATIONS

Office Action dated Aug. 9, 2021 in U.S. Appl. No. 16/945,011.
Office Action dated Aug. 18, 2021 in U.S. Appl. No. 16/945,130.

*Primary Examiner* — Jennifer Mehmood
*Assistant Examiner* — Donna J. Ricks
(74) *Attorney, Agent, or Firm* — Venable LLP

(57) ABSTRACT

The present teaching relates to method, system, medium, and implementations for data transfer in LED display. A signal signaling a timing for a next data transfer is received. In response to the signal, a next data transfer instruction is obtained that instructs reading a bit-based image block of an image from a memory. The bit-based image block is transferred, according to the next data transfer instruction, from the memory via a bus connected thereto, to one of a pair of alternate buffers pointed to by a write buffer pointer. Then, the write buffer pointer is toggled to point to another of the pair of alternate buffers and the process repeats. The bit-based image blocks alternately stored in the buffers are later retrieved and displayed on the LED display.

20 Claims, 45 Drawing Sheets
(32 of 45 Drawing Sheet(s) Filed in Color)

(56) References Cited

U.S. PATENT DOCUMENTS

| | | | |
|---|---|---|---|
| 5,874,928 A * | 2/1999 | Kou | G06F 3/1475 |
| | | | 345/1.1 |
| 7,495,671 B2 | 2/2009 | Chemel et al. | |
| 2002/0163513 A1 | 11/2002 | Tsuji | |
| 2010/0084992 A1 | 4/2010 | Valois et al. | |
| 2012/0081381 A1 | 4/2012 | Kobayashi | |
| 2012/0159128 A1 | 6/2012 | Gutierrez et al. | |
| 2014/0184667 A1 * | 7/2014 | Xu | G09G 3/3225 |
| | | | 345/692 |
| 2016/0012852 A1 | 1/2016 | Wouwer et al. | |
| 2016/0379551 A1 * | 12/2016 | Zhuang | G09G 3/3208 |
| | | | 345/520 |
| 2017/0097911 A1 * | 4/2017 | Maruyama | G06F 13/28 |
| 2017/0302972 A1 | 10/2017 | Zhang et al. | |
| 2018/0027243 A1 * | 1/2018 | Haghani | H04N 19/162 |
| | | | 375/240.02 |
| 2018/0218667 A1 | 8/2018 | Yamazumi et al. | |
| 2019/0005606 A1 * | 1/2019 | Yang | B60W 50/00 |
| 2020/0163082 A1 * | 5/2020 | Yamaura | H04L 49/9057 |
| 2020/0210177 A1 * | 7/2020 | Lakshminarayanan | H03K 7/08 |
| 2021/0248980 A1 * | 8/2021 | Lee | G09G 5/363 |

\* cited by examiner

| Panel [1,M] | Panel [2,M] | | Panel [K,M] |
|---|---|---|---|
| Panel [1,1] | Panel [2,1] | | Panel [K,1] |

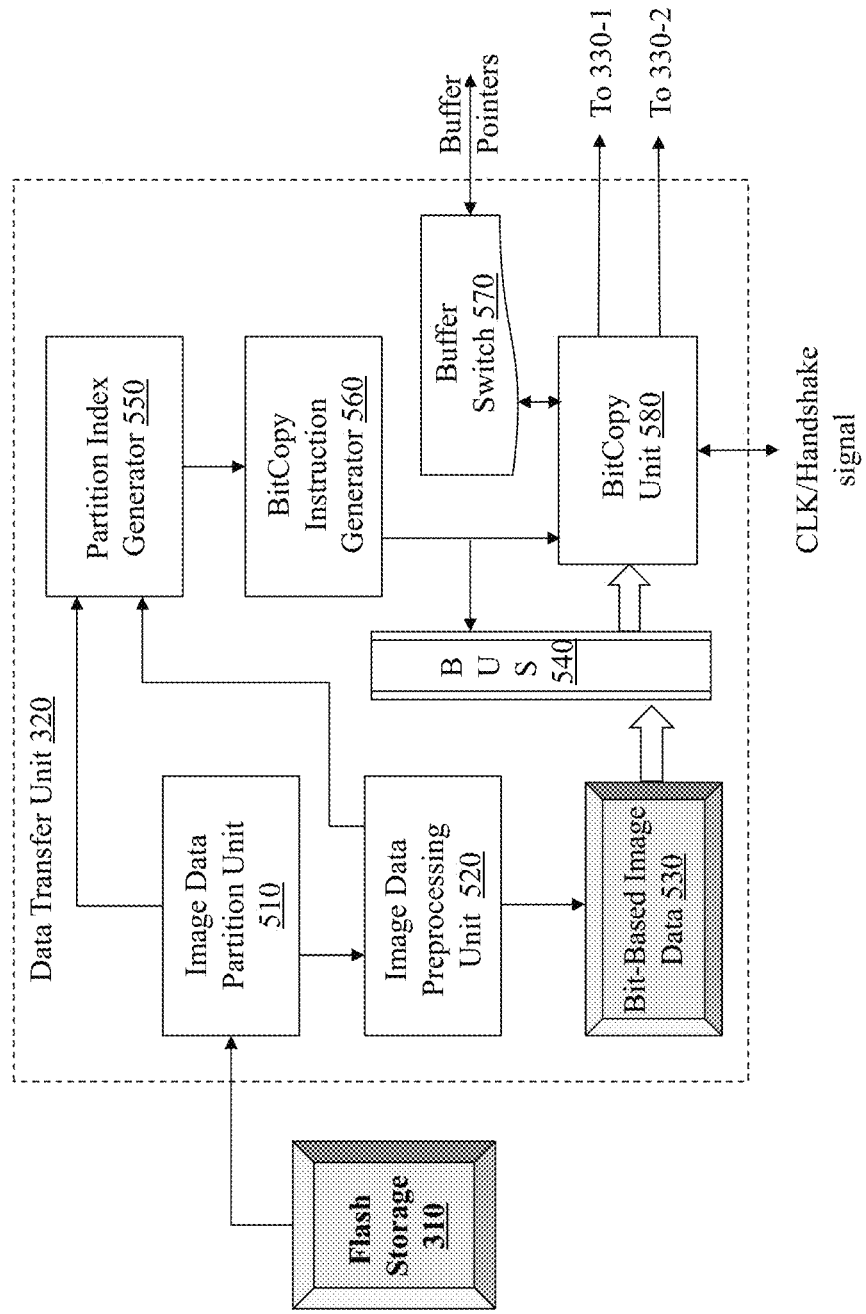

| K0 | K1 |
|---|---|
| A0 | A16 |
| B0 | B16 |
| A1 | A17 |
| B1 | B17 |
| A2 | A18 |
| B2 | B18 |
| A3 | A19 |
| B3 | B19 |
| A4 | A20 |
| B4 | B20 |
| A5 | A21 |
| B5 | B21 |
| A6 | A22 |
| B6 | B22 |
| A7 | A23 |
| B7 | B23 |
| A8 | A24 |
| B8 | B24 |
| A9 | A25 |
| B9 | B25 |
| A10 | A26 |
| B10 | B26 |
| A11 | A27 |
| B11 | B27 |
| A12 | A28 |
| B12 | B28 |
| A13 | A29 |
| B13 | B29 |
| A14 | A30 |
| B14 | B30 |
| A15 | A31 |
| B15 | B31 |

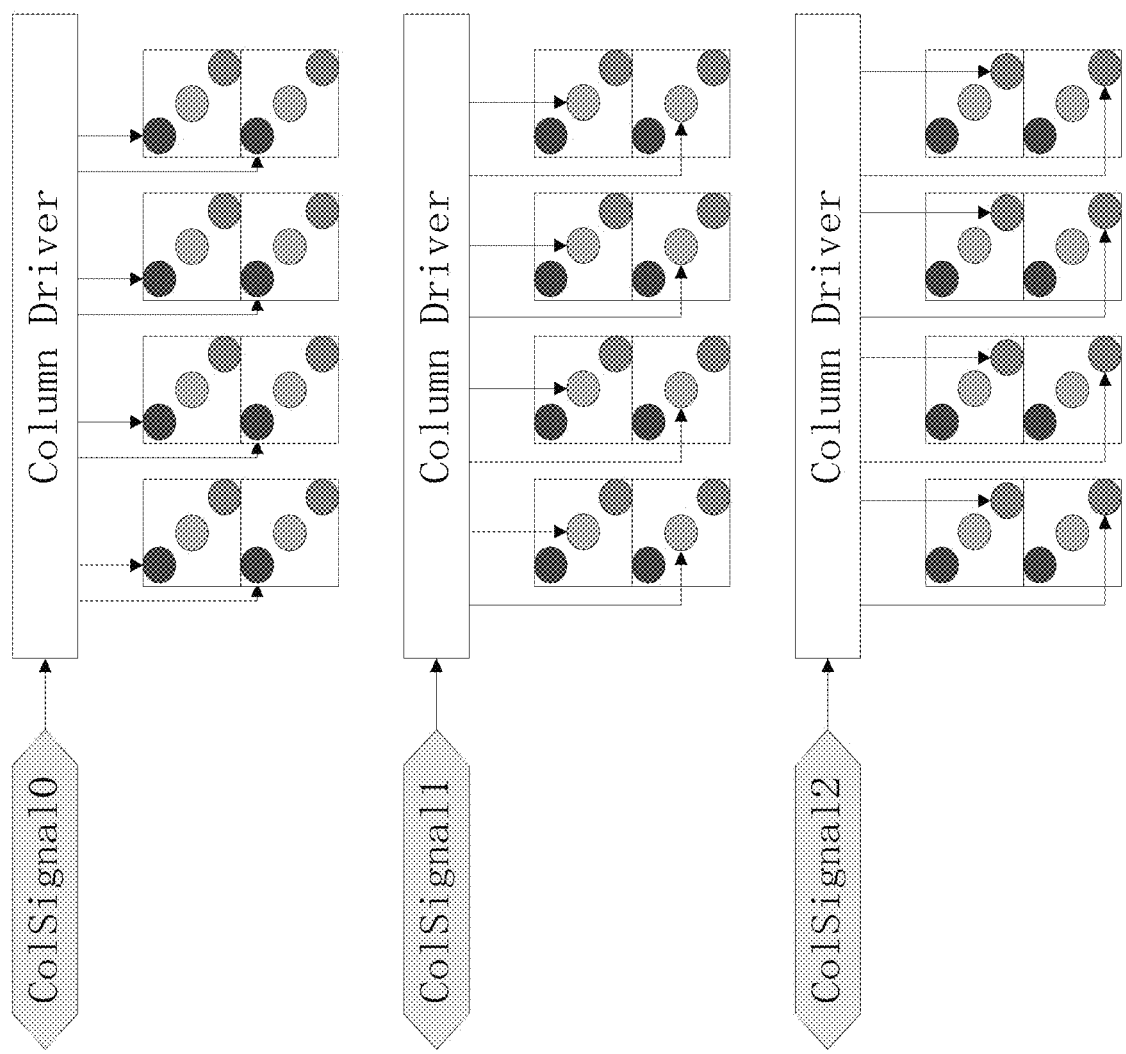

| T0 | T1 | T2 |
|---|---|---|
| A26 | A27 | A28 |
| A29 | A30 | A31 |
| A20 | A21 | A22 |
| A23 | A24 | A25 |
| A14 | A15 | A16 |
| A17 | A18 | A19 |
| A8 | A9 | A10 |
| A11 | A12 | A13 |
| A2 | A3 | A4 |
| A5 | A6 | A7 |
| B28 | B29 | B30 |
| B31 | A0 | A1 |
| B22 | B23 | B24 |
| B25 | B26 | B27 |
| B16 | B17 | B18 |
| B19 | B20 | B21 |
| B10 | B11 | B12 |
| B13 | B14 | B15 |
| B4 | B5 | B6 |
| B7 | B8 | B9 |
| C30 | C31 | B0 |
| B1 | B2 | B3 |
| C24 | C25 | C26 |
| C27 | C28 | C29 |
| C18 | C19 | C20 |
| C21 | C22 | C23 |
| C12 | C13 | C14 |
| C15 | C16 | C17 |
| C6 | C7 | C8 |
| C9 | C10 | C11 |
| C0 | C1 | C2 |
| C3 | C4 | C5 |

Fig. 15B

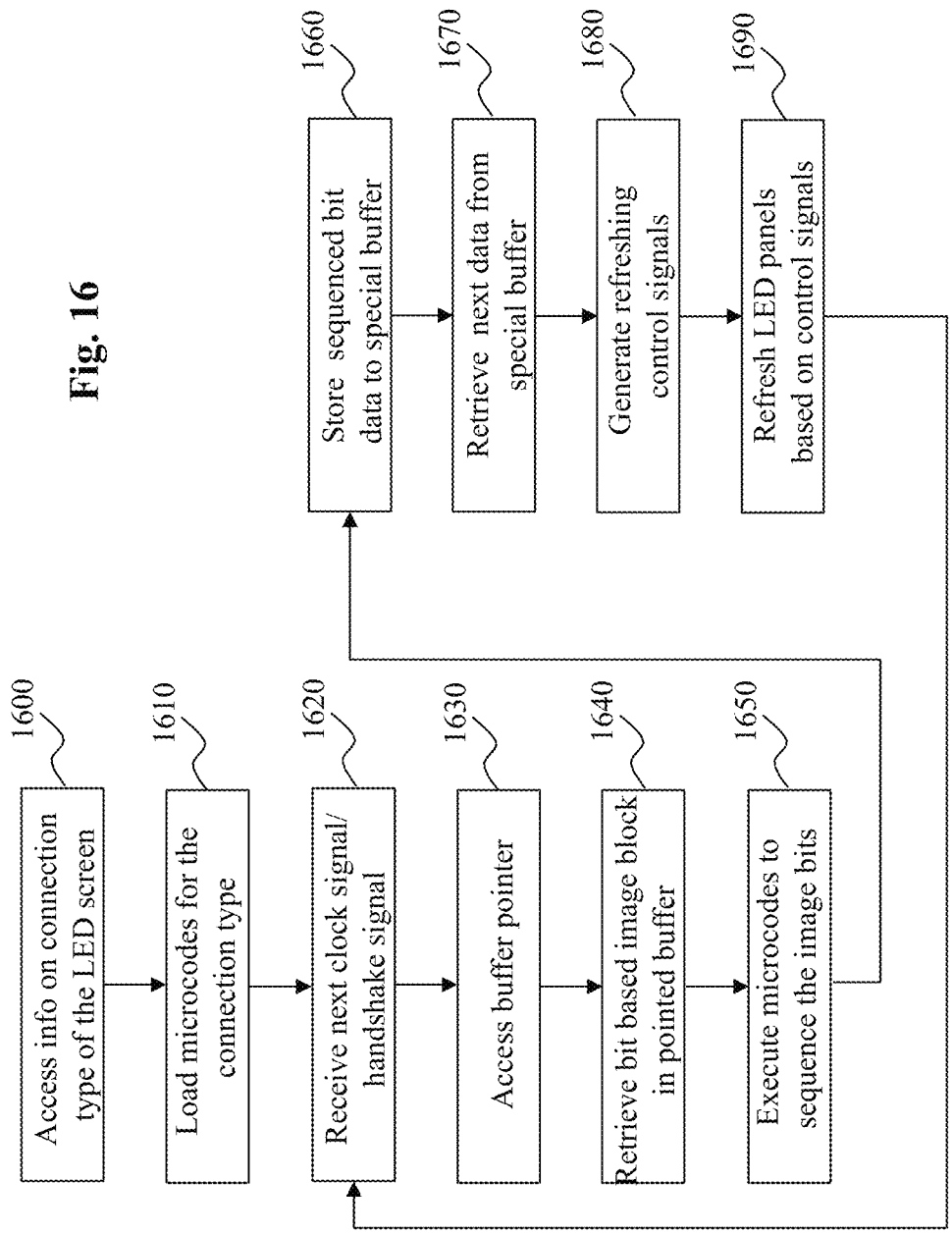

APPARATUS AND METHOD FOR DATA TRANSFER IN DISPLAY IMAGES UNTO LED PANELS

The present application is related to U.S. patent application Ser. No. 16/945,011, filed Jul. 31, 2020, and U.S. patent application Ser. No. 16/945,130, filed Jul. 31, 2020, the contents of which are hereby incorporated by reference in their entireties.

BACKGROUND

1. Technical Field

The present teaching generally relates to LED display. More specifically, the present teaching relates to display information on LED panels.

2. Technical Background

In a society with ubiquitous electronics, display panels are almost present for every piece of electronic device. Light-Emitting-Diodes (LED) display panels are one of the most popular and are generally flat display panels formed using modules or matrices of light emitting diodes. LED display panels are bright, large, and long lasting and are widely deployed at various public places such as airports, banks, stadiums, and hotels. They are also often used for displaying advertisements as billboards. This industry has enjoyed rapid growth in the last 10 years and still growing. y A LED display panel includes a display panel (with LED light bulbs and panel boards), controller(s), and LED drivers. In operation, LED drivers supply current to enable the LED light bulbs to emit lights, while the controller controls activities related to reading image data from storage and coordinating the operations of displaying the images onto the LED panels. The controller does so by sending control signals to the LED drivers at specific timings to turn on and off the LED lights at desired time instances in order to appropriately form images on the display. A controller plays a critical role in the performance and display effects of LED panels.

There are different types of LED panels. Some may be single-color, i.e., each pixel on the panel has one light which is either on or off (binary). Some may be dual color, i.e., each pixel on the panel has 2 lights, e.g., red and green, resulting in 4 different combinations: (1) red (red light on, green light off), (2) green (red light off, green light on), dark (both red and green lights off), and yellow (both red and green lights on). Some LED display panels are full-colored panels, with each pixel on the panel having three lights, corresponding to red, green, and blue. The number of intensity levels associated with each light determines the color resolution of the panel. The number of intensity levels is controlled by the duration the light is turn on. For example, a light of a particular color may have 256 levels in its intensity when lit and it is achieved by controlling the length of time the light is kept on.

In many applications, a large sized LED display panel is needed. For example, a LED billboard deployed at a stadium, at an airport, or at a stock exchange needs to be quite large to ensure visibility from a distance. Therefore, it is common to use many individual LED panels to form a larger LED display panel of a desired size. One example is shown in FIG. 1A, where a matrix of K rows and M columns of unit LED panels (smaller) forms a much larger LED display panel. When using multiple unit panels to form a larger one, the unit panels may be electrically connected in different ways. One exemplary way to connect 4×8 unit panels is shown in FIG. 1B, where LED unit panels in each row are driven electrically by a controller from one end to the other. FIG. 1C shows a different panel connection. The controller controls the current to all rows presented in this example. From circuit connection point of view, it is also shown in FIG. 1D where the electronic connections are along the row direction from one unit panel to the next in the same row.

Each unit panel is a matrix of pixels. A picture of an exemplary unit panel 110 with 16×32 pixels is provided in FIG. 1E. As discussed herein, each of the pixels has one or more lights. Each of the lights associated with each pixel in a unit panel may be controlled individually to be on or off with a certain time duration according to the image content at a corresponding location. FIG. 1F illustrates an example 8×8 full color image block 120, where each of the pixel has three color components, corresponding to red (R), green (G), and blue (B). Thus, as seen in FIG. 1F, the color block 120 has in effect three 8×8 matrices, one being R matrix, one being G matrix, and one being B matrix. For example, pixel 00 is composed of three values, R(00), G(00), and B(00), corresponding to its red component value, green component value, and blue component value, respectively. Each of the color components (R,G,B) may be represented by a number of bits, encoding the intensity level of the corresponding color component. For instance, if each color component has 3 bit, it yields 8 intensity levels; if each color component has 8 bits, it yields 256 intensity levels, etc. Such coded intensity levels will then be used to control the timing and duration of LED lights when display the image content on to the LED display panel.

An LED light associated with a pixel location of an LED panel is turned on when both a row signal controlled by a row driver and a column signal controller by a column driver provide a current from both directions. One example is shown in FIG. 1G, where each row driver is configured to drive multiple rows of pixels and a column driver is configured to drive all columns as shown. If a particular LED light located at a certain row and a certain column is to be turned on, the row signal passing through the certain row and the column signal passing through the certain column are controlled to supply a current to that location. Column drivers are serially connected, both internally in a unit panel and across different unit panels. Such connections may be determined based on how unit panels are connected.

As illustrated in FIGS. 1B and 1C, unit panels forming a larger LED display panel may be connected in different ways. The column drivers on each unit panel may also be connected in different ways. FIG. 1H shows an exemplary column connection scheme linking different column drivers on each unit panel. In FIG. 1H, starting from the top column driver [1,1] in the left column, signals travel from column driver [1,1] to column driver [K,1] in the bottom row and then back to the top row column driver [1,2] of the next column and then follow the same pattern until reaching the last column driver [K,M]. As inside of each unit panel is a matrix of pixels and a column signal may travel within each unit panel.

There are synchronous and asynchronous operational modes in LED panel display. In the synchronous mode, the images are supplied on-the-fly (e.g., streaming) so that the LED display has to be synchronous. In the asynchronous mode, images are stored first and at the time of displaying on an LED display panel, images are retrieved from storage and then are displayed accordingly. There are different traditional approaches to achieve asynchronous operation.

One approach is to use a Microcontroller Unit (MCU) and the other is to use an MCU together with a Field-Programmable Gate Array (FPGA). FIG. 2A illustrates a construct of a traditional controller implementation using an MCU. As shown, there is an image storage 205, which stores images to be displayed on to an LED display panel, and an MCU 210. To display an image on to an LED display panel, the MCU 210 reads the image from the storage 205, process the image data, transform the processed data in a suitable form screen refreshing for the display, and generate and transmit appropriate control signals (such as row/column signals, as clock signal CLK) to the display panel controller. FIG. 2B provides an exemplary construct of the MCU 210. Typically, the MCU 210 comprises a flash read module 220 and a Central Processing Unit (CPU) 230. The flash read module 220 is provided for reading relevant information from the storage 205, which may include the image data to be displayed and other peripheral information, e.g., some operational parameters such as a front library 207. The image data, once read, is stored in a buffer 215 so that it can be accessed by the CPU 230 for processing. CPU 230 processes the image data, either from 215 or directly from the flash read module 220. This may include any special effect processing and transformation. The processed images may also be used by the CPU 230 to transform the image data to the information that can be used to refresh the LED. Such transformed refreshing information may be stored in a SRAM storage 225 within the MCU and subsequently transmitted, via a GPIO interface, to the LED display panel. In this implementation, all operations on graphical computation, data transformation, and screen refreshing are performed by the software in MCU 210 running on the CPU 230. It is known that the processing speed using software is slower. Given the nature of LED display, such a slow speed using a solution as shown in FIG. 2B makes an MCU based solution typically only suitable for small LED display screens.

Another traditional solution that addresses the speed issue is illustrated in FIG. 2C with a solution for asynchronous LED display using a combination of an MCU 240 and a field programmable gate arrays (FPGA) 250. In this implementation, the MCU 240 is typically used for reading data and performing graphical computations. Data prepared by the MCU 240 is then transmitted to the FPGA 250, which is responsible for data transformation and screen refreshing. As shown, each of the MCU 240 and the FPGA 250 has its own SDRAM 245 and 255, respectively, for storing image data. LCD interfaces or other interfaces with GPIOs are used between the MCU 240 and the FPGA 250 to transfer data.

Although the solution with MCU in combination of FPGA may alleviate the speed issue associated with MCU only solution, there are other deficiencies associated with these traditional solutions to LED display. First, both approaches require significant memory resources. The MCUs in both approaches need to read one or more entire images and store them in the SRAM. This calls for significant SRAM resources for most MCUs. Accordingly, the size or number of LED lights of an application LED screen needs to be limited by the SRAM capacity of the MCU. For large screens with a large number of pixels or full color LED screen, the solution with MCU in combination with FPGA may be used for an enhanced speed by having the FPGA to perform data transformation and screen refreshing. However, additional drawbacks still exist. A typical concern is the cost associated with FPGA. To implement the same logic functions, the cost associated with FPGA is much higher than other solutions.

Thus, there is a need for methods and systems that address the shortcomings associated with the traditional solutions for LED display.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for data transfer in LED display. A signal signaling a timing for a next data transfer is received. In response to the signal, a next data transfer instruction is obtained for reading a bit-based image block of an image from a memory. The bit-based image block is transferred, according to the data transfer instruction, from the memory via a bus connected thereto, to one of a pair of alternate buffers pointed to by a write buffer pointer. Then, the write buffer pointer is toggled to point to another of the pair of alternate buffers and the process repeats. The bit-based image blocks alternately stored in the buffers are later retrieved and displayed on the LED display.

In a different example, a system for data transfer in LED display comprises a bitCopy instruction generator and a bitCopy unit. The bitCopy instruction generator is configured for generating a plurality of data transfer instructions, each of which instructing reading a bit-based image block of an image from a memory. The bitCopy unit is configured for receiving a signal signaling a timing for a next data transfer and, in response to the signal, performing various steps, including obtaining a next data transfer instruction for reading a next bit-based image block of the image from the memory, transferring, based on the next data transfer instruction, the next bit-based image block from the memory, via a bus connected thereto, to one of a pair of alternate buffers pointed to by a write buffer pointer, and toggling the write buffer pointer to point to another of the pair of alternate buffers. The process repeats on the received signals, where bit-based image blocks transferred to the pair of alternate buffers are to be retrieved for being displayed on the LED display.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for data transfer in LED display. A signal signaling a timing for a next data transfer is received. In response to the signal, a next data transfer instruction is obtained for reading a bit-based image block of an image from a memory. The bit-based image block is transferred, according to the data transfer instruction, from the memory via a bus connected thereto, to one of a pair of alternate buffers pointed to by a write buffer pointer. Then, the write buffer pointer is toggled to point to another of the pair of alternate buffers and the process repeats. The bit-based image blocks alternately stored in the buffers are later retrieved and displayed on the LED display.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 1A-1B (PRIOR ART) show exemplary arrays of LED unit panels forming a larger LED display panel via different panel connections;

FIG. 1F (PRIOR ART) illustrates an exemplary representation of an 8×8 LED unit panel with full colors;

FIG. 5 depicts an exemplary high level system diagram of a data transfer unit, in accordance with an embodiment of the present teaching;

FIG. 9C shows content in registers when they are loaded with image data in a single color, in accordance with an embodiment of the present teaching;

FIG. 9D shows the result of sequencing the bits in a register loaded with image data in a single color to facilitate snake type I connection, in accordance with an embodiment of the present teaching;

FIG. 10C shows the result of sequencing the bits in registers loaded with pixels of different rows in a single color to facilitate snake type II connection, in accordance with an embodiment of the present teaching;

FIG. 13C shows content in registers loaded with pixels in dual color, in accordance with an embodiment of the present teaching;

FIG. 13D shows the result of sequencing the bits in registers loaded with pixels in dual color to facilitate snake type II connection, in accordance with an embodiment of the present teaching;

FIG. 14C shows content in registers loaded with pixels in full color, in accordance with an embodiment of the present teaching;

FIG. 14D shows the result of sequencing the bits in registers loaded with pixels in full color to facilitate driving each of the different color components separately, in accordance with an embodiment of the present teaching;

FIG. 15A shows a representation of driving each color component separately in snake type I connection, in accordance with an embodiment of the present teaching;

FIG. 15B shows the result of sequencing the bits in registers loaded with pixels in full color to facilitate snake type II connections, in accordance with an embodiment of the present teaching;

FIG. 16 is a flowchart of an exemplary process of a refresh processor, in accordance with an embodiment of the present teaching.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches to asynchronous LED display. As discussed herein, the traditional systems either require significant memory resources or demand costly solutions. The present teaching discloses a system and method for asynchronous LED display that requires insignificant memory resources and is cost effective. In addition, the present teaching is directed to a solution that can be flexibly used for LED screen with LED unit panels connected in different ways. Furthermore, the disclosed system and method are fast so that they can be used for displaying on large LED panels.

Specifically, the present teaching discloses a controller system for LED display with a data transfer unit and a refresh processor, both clocked by the same clock signal, and a small data storage bridging the data transfer unit and the refresh processor for buffering the image data from the data transfer unit which is needed by the refresh processor for the near future.

Figure 3A:
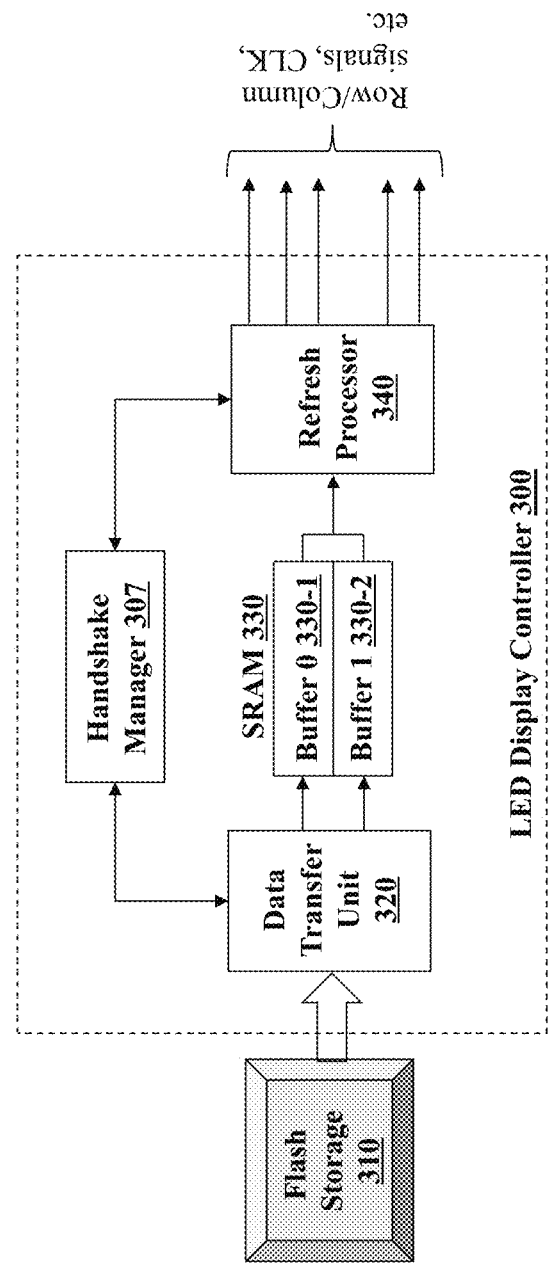
FIG. 3A depicts an exemplary high level system diagram of a controller for LED display with handshake, in accordance with an embodiment of the present teaching.

FIG. 3A depicts an exemplary high level system diagram of an LED display controller 300 with handshake, in accordance with an embodiment of the present teaching. As seen, the LED display controller 300 takes image data from a storage 310 and outputs a number of signals that are used to control the display on an LED display panel. The storage 310 may be a flash memory or any other form of data storage that facilitates fast accesses. The output signals from the controller 300 may include row/column signals, clock signal, etc., where the row/column signals are used to drive rows and columns to control the states of the lights (one/off and/or duration of each state to achieve intensities determined based on the pixel content) associated with each of the pixels on the LED screen. Such control signals are generated appropriately in accordance with the image content.

The LED display controller 300 comprises a data transfer unit 320, a SRAM storage 330, a refresh processor 340, and a handshake manager 307. In this illustrated embodiment, the operations of the data transfer unit 320 and the refresh processor 340 are coordinated via some synchronization signals such as a certain handshake protocol which is, e.g., managed by the handshake manager 307. Through such coordination, the data transfer unit 320 and the refresh processor 340 are synchronized so that the data transfer unit 320 supplies image data to a smaller buffer 330 and the refresh processor 340 retrieves image data from the buffer on the-fly. On each supply of an image data block, it may be followed by a synchronized operation of the refresh processor 340. Based on this operational mode, only a limited image data needs to be stored in the SRAM, significantly reducing the requirement on the memory resource.

When synchronized via a handshake protocol, once the data transfer unit 320 stores an image data block in first one of the alternate buffers, it may send a handshake signal to the handshake manager 307 to indicate that it completes data transfer to the first buffer and then proceeds to transfer a next image block into the alternate buffer. Once that is accomplished, the data transfer unit 320 waits until receiving a handshake signal from the refresh processor 340 indicating that the image block in the first buffer has been retrieved so that the first buffer can now be used to load another image data block. For the refresh processor 340, upon receiving a handshake signal from the data transfer unit 320 indicating that image data block is now available in a first buffer, the refresh processor 340 proceeds to retrieve the image data block from the first buffer for its processing. Upon retrieving the first image block from the first buffer, the refresh processor 340 sends its handshake signal to the data transfer unit 320 (e.g., via the handshake manager 307) to inform the data transfer unit 320 that the first image block has been retrieved.

Although synchronized, the data transfer unit 320 and the refresh processor 340 are operate on different buffers at each specific time instance. However, so long as the processing speed of both can match, the size of the buffer 330 or SRAM storage 330 can be kept very small. In this illustrated embodiment, the SRAM storage includes two buffers 330-1 and 330-2, both of which may be of the same size, e.g., determined by the size of the image data block on each read. The choice of the size of the buffers may be determined based on different considerations. For instance, it may correspond to the width of an image, the height of the image, or an amount of data that refresh processor 340 takes in one batch for its processing. If it corresponds to the width of the image to be displayed, it may facilitate the refresh processor 340 to process one row of the image at a time. Similarly, a buffer size equal to the length of an image can facilitate the refresh processor 340 to process, with each batch, an entire column of pixel data. The size of the buffer may also be of any size that an application demands. Due to the fact that each buffer is of the size of each read, the amount of data to be buffered in 330 is much smaller than an entire image.

As at each moment, the data transfer unit 320 and the refresh processor 340 are operating on different buffers, another aspect of synchronization may be achieved via pointers. That is, a write pointer pointing to one of the two buffers for loading, by the data transfer unit 320, an image block into that buffer and a read pointer pointing to the other alternate buffer for reading, by the refresh processor 340, to read from the other alternate buffer for display related processing. The data transfer unit 320 toggles the write pointer after it loads am image block into one of the buffers and after it receives the next handshake signal from the refresh processor 340 indicating the previous image block stored therein has been retrieved. Similarly, the refresh processor 340 toggles the read pointer after it reads an image block from a buffer pointed to by the read pointer and receives a handshake signal from the data transfer unit 320 indicating that new image data has been loaded into the other alternate buffer.

Figure 3B:
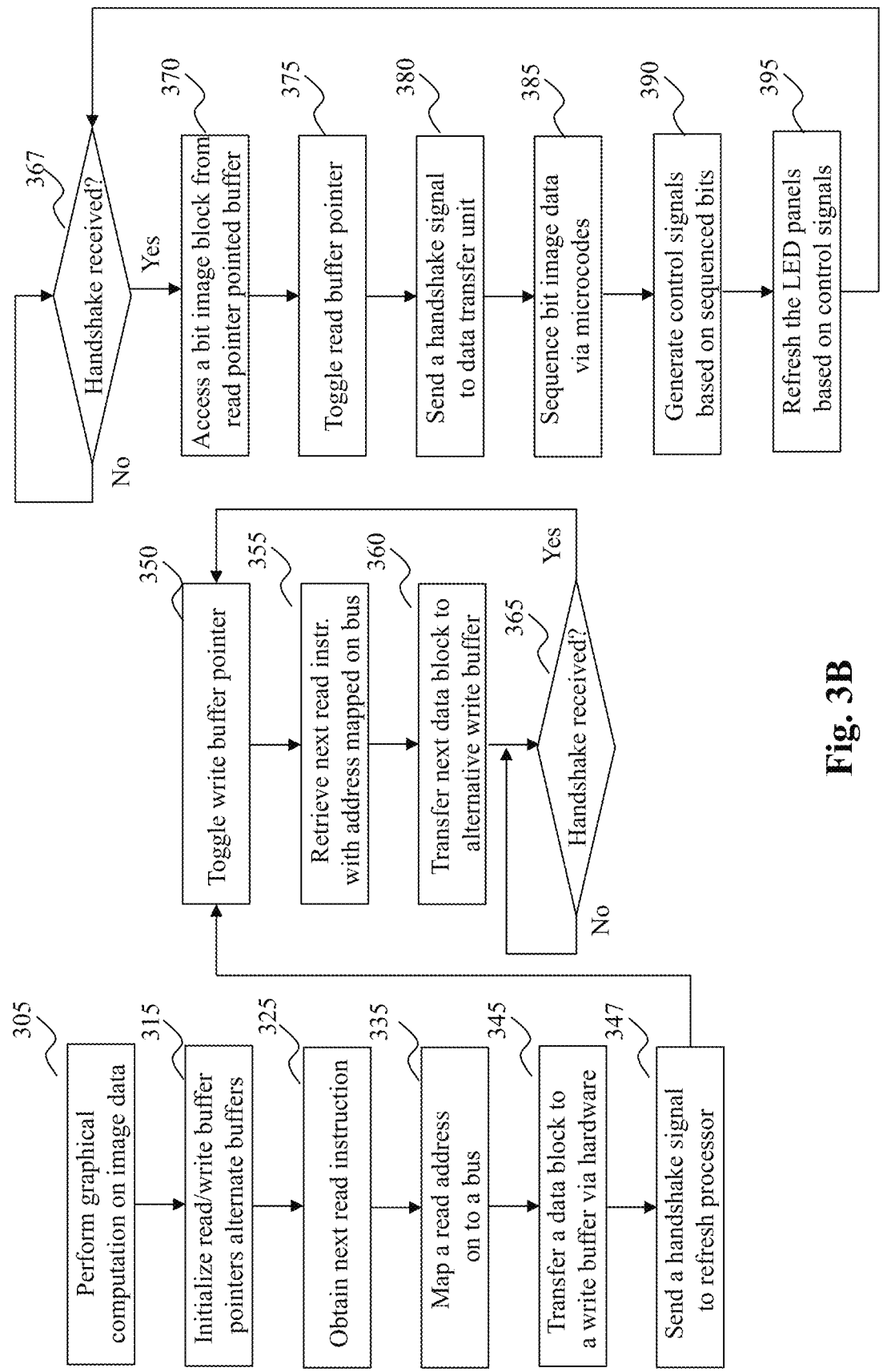
FIG. 3B is a flowchart of an exemplary process for a controller for LED display with handshake, in accordance with an embodiment of the present teaching.

FIG. 3B is a flowchart of an exemplary process for the LED display controller 300 with handshake, in accordance with an embodiment of the present teaching. At 305, the data transfer unit 320 perform graphical computation on image data stored in the image data storage 310. Such graphical computation may be optional and the processing may include, e.g., certain special effect treatment on the images. The preprocessing may also include other types of data processing. For example, according to one aspect of the invention, the original image data may be re-organized. A color image is generally provided with multiple frames, each frame corresponding to one color component such as red, green, or blue. With this organization, data bits of different colors are stored in different frames. One possible processing is to reorganize the image data so that corresponding bit from each color component may be stored together. For example, if a full color image has an 8-bit color representation in each of the three color frames in red, green, and blue. After the re-organization, the converted image data has 8 frames, each pixel having three bits, each being a corresponding bit from a respective color component. Such preprocessed image data is then stored internally in the data transfer unit 320.

In operation, the data transfer unit 320 may then initialize, at 315, buffer pointers pointing at alternate buffers. For example, the initialization may set the write and read pointers to point at both one of the alternate buffers, e.g., buffer 330-1. To start the data transfer operation, the data transfer unit 320 then obtains, at 325, the next read instruction (details discussed below) for retrieving a block of image data from its internal storage. In some embodiments, the read instruction includes a starting address of the image block to be read from the internal storage as well as a length of the image block.

To ensure high speed read, the data transfer unit 320 maps, at 335, the address of the image block directly on the bus connected with the storage to facilitate reading the image block via hardware. It then transfers, at 345, the read image block to the buffer that the write pointer is pointing at. Once completing the transfer of the first image block to the buffer 330, the data transfer unit 320 sends, at 347, a handshake signal to the refresh processor 340 via the handshake manager 307, which informs the refresh process 340 that the image data block is now available in the buffer.

After sending out the handshake signal, the data transfer unit 320 proceeds to write the next image data block into the alternate buffer. To do so, the data transfer unit 320 toggles, at 350, the write pointer to the alternate buffer and retrieves, at 355, the next read instruction for reading the next image block and maps the address of the next image block on the bus to facilitate fast reading. The newly retrieved image block is then transferred, at 360, to the alternate buffer pointed to by the write pointer. At this point, the data transfer unit 320 checks at 365, whether a handshake signal is received from the refresh processor 340. Such a handshake signal from the refresh processor 340 indicates that the image data stored in the first buffer has been retrieved so that is can now be used to transfer a new image block. When that happens, the data transfer unit 320 toggles, at 350, the write pointer to point at the first alternate buffer and load the next image block by carrying out the steps 355 and 360. The process continues in such loops with the coordination achieved via handshake signals and buffer pointers.

The refresh processor 340 also acts on handshake signals. With the read pointer initialized to point at the first of the two buffers, i.e., 330-1, the refresh processor 340 first checks, at 367, whether it receives a handshake signal from the data transfer unit 320 indicating that image data has been transferred to buffer 330-1. When it receives the handshake signal, the refresh processor 340 accessed, at 370, the first image block stored in the first buffer 330-1 based on the read pointer (which points at buffer 330-1). Upon the first image block retrieved from buffer 330-1, the refresh processor 340 toggles, at 375, the read pointer to point at buffer 330-2 and then sends, at 380, a handshake signal to the data transfer unit 320 to indicate that the image data buffered in 330-1 has been retrieved so that it can now be used to transfer new image data.

Then the refresh processor 340 proceeds to carry out the processing on the retrieved image data, including sequencing, at 385, the bits in the retrieved image data according to the connection pattern of the LED display, generating, at 390, control signals based on the image content, and then refreshing, at 395, the LED screen using the control signals. According to the present teaching, too transform the accessed image data to control signals, the refresh processor 340 may re-sequence, if needed, the image data bits in the first image data block. The way image bits are sequenced depends on the wire connection pattern. In some situations, the sequencing may be executed using microcodes, which is programmed specifically with respect to the connection pattern of the driving connections in the unit panels of the LED display panel. Based on the sequenced image data, the refresh processor 340 then generates various control signals that are used to realize the image content on the LED display panel. After completing the processing of the retrieved image data, the refresh processor 340 checks, at 367, to see if the data transfer unit 320 sends a next handshaking signal to indicate that image data has been transferred into the other alternate buffer 330-2. If not, the refresh processor 340 waits until the new image data is made available in the alternate buffer.

Figure 3C:
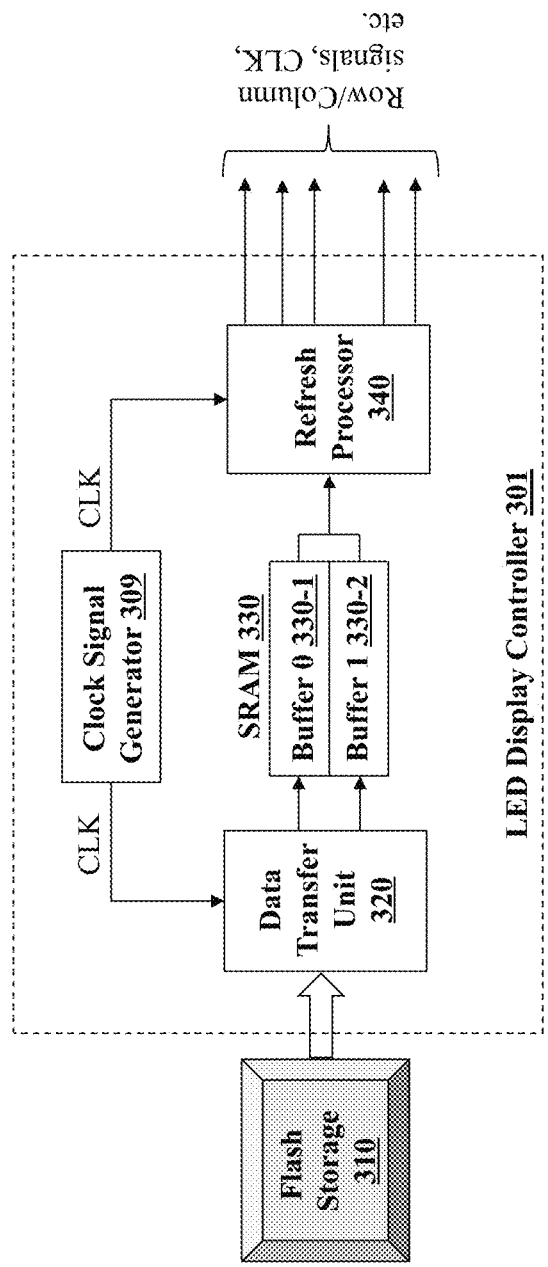
FIG. 3C depicts an exemplary high level system diagram of a controller for LED display with a shared clock, in accordance with an embodiment of the present teaching.

FIG. 3C depicts another exemplary high level system diagram of a LED display controller 301 with a shared clock, in accordance with an embodiment of the present teaching. As can be seen, the LED display controller 301 herein is similarly constructed as that of 300 except that the data transfer unit 320 and the refresh processor 340 are now coordinated via a common clock signal generated by a clock signal generator 309 (rather than via handshake managed by the handshake manager 307 as shown in FIG. 3A). Similarly, the LED display controller 300 comprises a data transfer unit 320, a SRAM storage 330, a refresh processor 340, and a clock signal generator 309. The clock signal generated by the clock signal generator 309 may be used by both the data transfer unit 320 and the refresh processor 340 so that the data transfer unit 320 and the refresh processor 340 are synchronized based on the same clock. As discussed herein, the data transfer unit 320 retrieves image data from the storage 310, processes the retrieved data, and place it on the SRAM storage 330. The refresh processor 340 accesses the processed data from SRAM storage 330, transform the accessed image content into control signals that can be used to display the image content on the LED screen, and output such control signals to the LED display panel.

In this embodiment, as both the data transfer unit 320 and the refresh processor 340 are clocked on the same signal, the frequency by which the refresh processor needs new image data also governs the frequency by which the data transfer unit 320 places processed image data into the SRAM storage 330. Similarly, as the processing speed of the data transfer unit 320 keeps up with that of the refresh processor, the size of the SRAM storage can be kept very small. To operate, on each clock, the data transfer unit 320 may retrieve, e.g., on the rising edge of the first clock signal, image data from the storage 310, process the image data, and save processed image data in the first buffer 330-1 on, e.g., the falling edge of the first clock signal. Then, on the rising edge of the second clock, the data transfer unit 320 may retrieve the next batch of image data, process the image data, and save the processed image data in the second buffer 330-2 on, e.g., the falling edge of the second clock. Acting on the same clock signals, the refresh processor 340 may access the processed image data stored in the first buffer 330-1 on, e.g., the rising edge of the second clock, transform the processed image data into control signals, and output the transformed signals on, e.g., the falling edge of the second clock. The refresh processor 340 may then proceed to access, e.g., on the rising edge of the third clock signal, the processed image data from the second buffer 330-2, transform the accessed image data into control signals, and output the control signals. While the refresh processor 340 is accessing the processed image data buffered in the second buffer 330-2, the data transfer unit 320 retrieves next batch of image data from storage 310, process it, and alternately save the processed image data back in buffer 330-1 again. In this manner, by ensuring that the data transfer unit 320 and the refresh processor 340 can act in concert and in sync, the SRAM storage 330 can be kept small.

Figure 3D:
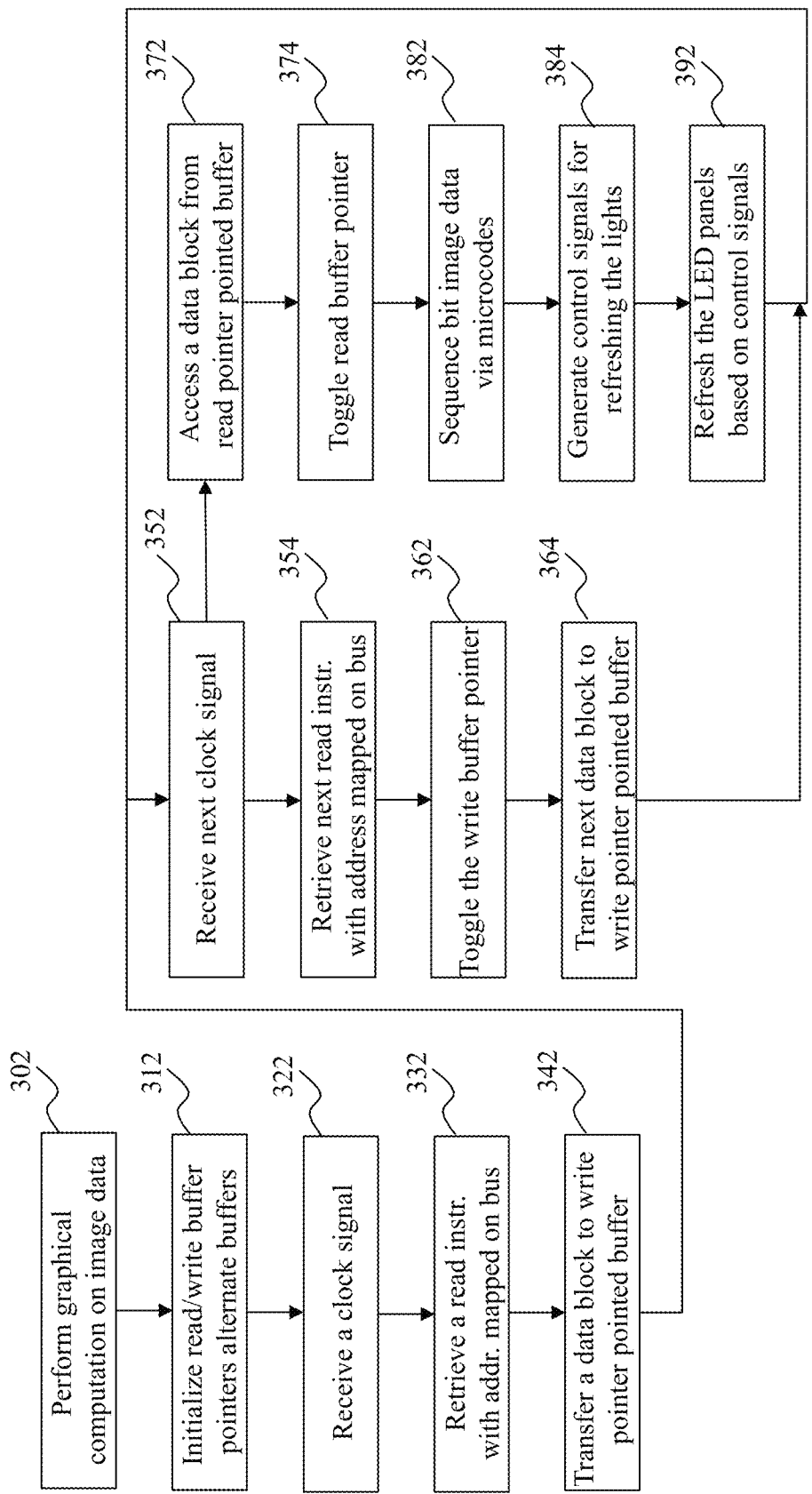
FIG. 3D is a flowchart of an exemplary process for a controller for LED display with a shared clock, in accordance with an embodiment of the present teaching.

FIG. 3D is a flowchart of an exemplary process for the LED display controller 301 with a shared clock, in accordance with an embodiment of the present teaching. At 302, the data transfer unit 320 performs graphical computation or other type of image preprocessing on image data stored in the image data storage 310. As discussed herein, such preprocessed image data may be stored in a memory internally in the data transfer unit 320. To facilitate alternately storing image data in the buffer 330, the data transfer unit 320 may initialize, at 312, write and read buffer pointers to initially point at, e.g., buffer 330-1. In this implementation, to synchronize the operation, the data transfer unit 320 and the refresh processor 340 operate based on the clock signal generated by the clock signal generator 309. First, the data transfer unit 320 receives, at 322, the next clock signal and then act on the clock signal to retrieve, at 332, the next read instruction (detailed discussed below). As discussed herein, a read instruction may incorporate both a starting address of the image block to be read as well as a length of the image block.

To keep up with the speed of the refresh processor 340, the data transfer unit 320 maps the address of the image block directly on a bus that connects to the internal memory and then transfers, at 342, the image block to the buffer, e.g., 330-1, to which the write pointer is pointing. Once completing the transfer of the first image block to the buffer 330, the data transfer unit 320 waits to receive, at 352, a next clock signal. At the same time, this next clock signal is also received by the refresh processor 340 and can be relied on to start to synchronize the operations of both from this point on. Acting on the next clock signal, the data transfer unit 320 retrieves, at 354, the next read instruction for reading the next image block from the internal memory and maps the address of the next image block on the bus to facilitate fast transfer. To prepare for the next buffering, the buffer pointer is toggled, at 362, to point to the alternate buffer, e.g., 330-2. After the write pointer is switched to point at buffer 330-2, the data transfer unit 320 transfers, via hardware at 364, the next image block to buffer 330-2. Then the operation of the data transfer unit 320 repeats the cycle by returning to step 352.

Also acting on the next clock signal, the refresh processor 340 takes actions by first accessing, at 372, the first image block stored in buffer 330-1, pointed to by the current read pointer. Once the image data in buffer 330-1 is retrieved, the refresh processor 340 toggles, at 374, the read pointer to point to the alternate buffer 330-2, indicating that the next buffer to read image data is from buffer 330-2. To transform the accessed image data to control signals, the refresh processor 340 sequences, if needed at 382, the bits in the image data via microcodes, which are programmed specifically with respect to the connection pattern of the unit panels in the current LED display panel so that bits in the image data can be sequenced in a way suitable for the current connection pattern. Based on the re-sequenced image data, the refresh processor 340 then generates, at 384, various control signals to be used for refreshing, at 392, lights for pixels of the LED display panel to render the image data on the LED display panel. Then the operation of the refresh processor 340 repeats by returning to step 352.

Figure 4A:
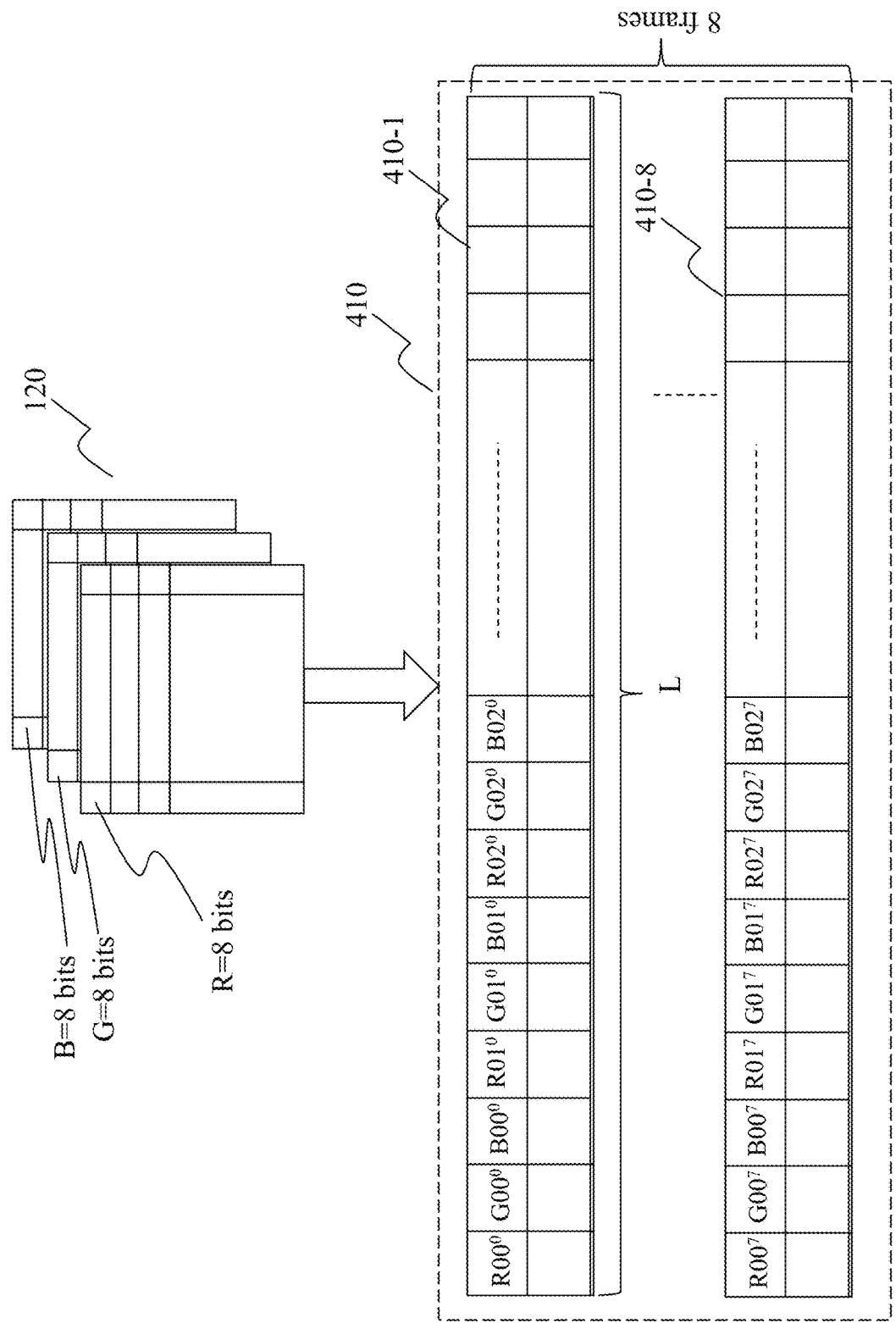
FIG. 4A shows an exemplary representation of color image data to facilitate LED display, in accordance with an embodiment of the present teaching.

Details related to how the present teaching operates are disclosed below. FIG. 4A shows an exemplary organization of image data in full color arranged to facilitate LED display, in accordance with an embodiment of the present teaching. A conventional image corresponds to an array of pixels. When it is in full color, such as 120 in FIG. 1E, the image has three images frames, each of which corresponds to one color components R, G, and B. Depending on the resolution, each pixel of each of the color frame is coded by a number of bits, e.g., 8 bits representing 256 intensities in that color component space. To facilitate the present teaching, bits in an image information is organized as illustrated in FIG. 4A. For each image in full color with each color component having 8 bits, the image (410) is represented by 8 frames (410-1, . . . , 410-8)), each of which represents one bit from each color frame. For example, in frame 1 410-1, the first pixel 00 is represented by three bits, one bit from each color frame on the corresponding bit position. That is, $R00^0$ is the lowest bit of the 8 bit representation of the R component for pixel 00, $G00^0$ is the lowest bit of the 8 bit representation of the G component for pixel 00, and $B00^0$ is the lowest bit of the 8 bit representation of the B component for pixel 00. In addition, $R00^1$ is the second lowest bit of the 8 bit representation of the R component for pixel 00, $G00^1$ is the second lowest bit of the 8 bit representation of the G component for pixel 00, and $B00^1$ is the second lowest bit of the 8 bit representation of the B component for pixel 00 (not shown). All the way, $R00^7$ is the highest bit of the 8 bit representation of the R component for pixel 00, $G00^7$ is the highest bit of the 8 bit representation of the R component for pixel 00, and $B00^7$ is the highest bit of the 8 bit representation of the B component for pixel 00. Similarly, for other pixels of a full color image, image information may be organized in the same way. For example, FIG. 4A shows that how color information for pixels 01 and 02 is organized.

Figure 4B:
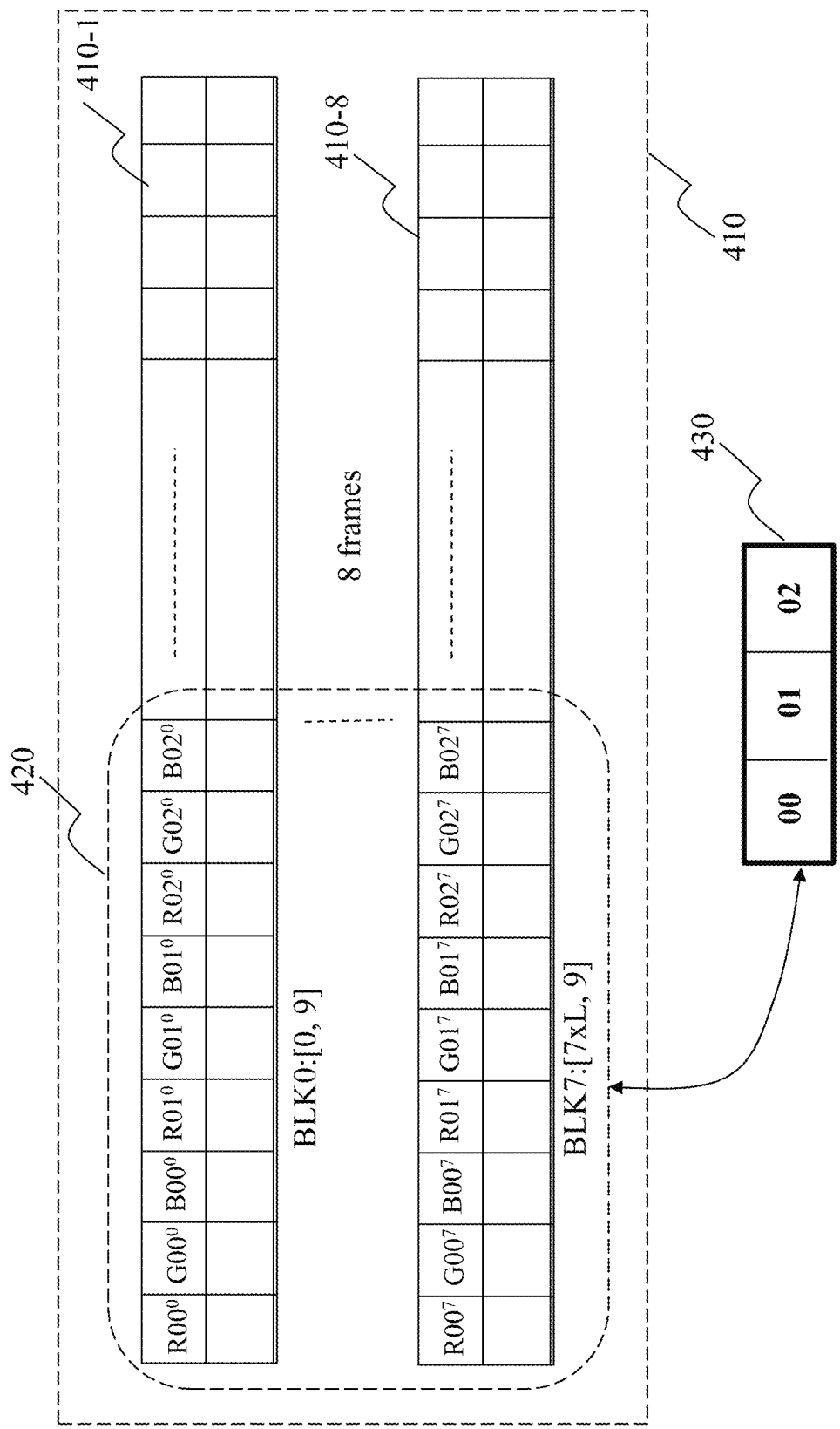
FIG. 4B shows an exemplary scheme of encoding a 1×3 image data blocks, in accordance with an embodiment of the present teaching.

With this organization, color information of the same bit for each pixel is now stored together so that it is possible to read such information without going across different color frames. It is significant because it enable a way to compress the image data and at the same time facilitate a more effective information transformation for refreshing the LED display as described below. FIG. 4B shows an exemplary scheme of encoding a 1×3 image data block 430, in accordance with an embodiment of the present teaching. As shown, the 1×3 image data block including pixels 00, 01, and 02 which is represented by the bit block 420 with 8 rows of bits representing the full color of the 3 pixels. 420 has 8 blocks of bits, corresponding to block 0 BLK0 with a read starting address 0 (relatively) and length (or number of bits) 9, . . . , block 7 BLK7 with a starting address of 7×L and length 9, where L is the length of each frame (see FIG. 4A).

In asynchronous LED display, an original image data may first be preprocessed and the processed image data may then be stored before the display. In some embodiments, the preprocessing may be done offline. For example, the data transfer unit 320 may read the original image data from storage 310, preprocess the image data by performing the bit based re-organization as described in FIGS. 4A-4B, and such re-organized image data (bit based) may then be stored internally to the data transfer unit 320 to allow subsequent data access in high speed. To facilitate transferring bit based image data or an operation called bitCopy, the present teaching discloses an image compression scheme in the form of bitCopy instructions. Such bitCopy instructions control the data transfer unit 320 in data transfer operation and each of the instructions is encoded with a starting address and a length of each image block to be transferred. For example, BLKi[SAi, Li] corresponds to a generic bitCopy instruction with SAi representing the starting address and Li representing the number of bit to read. Given that, bitCopy instruction BLK2[ SA2, L2] is an instruction to instruct the data transfer unit 320 to read bits starting at address SA2 for L2 number of bits. Based on this representation, to traverse the entire image in reading, it can be encoded in a much compressed form with a series of bitCopy instructions which, when executed by the data transfer unit 320, will traverse the entire bit based image data.

Figure 4C:
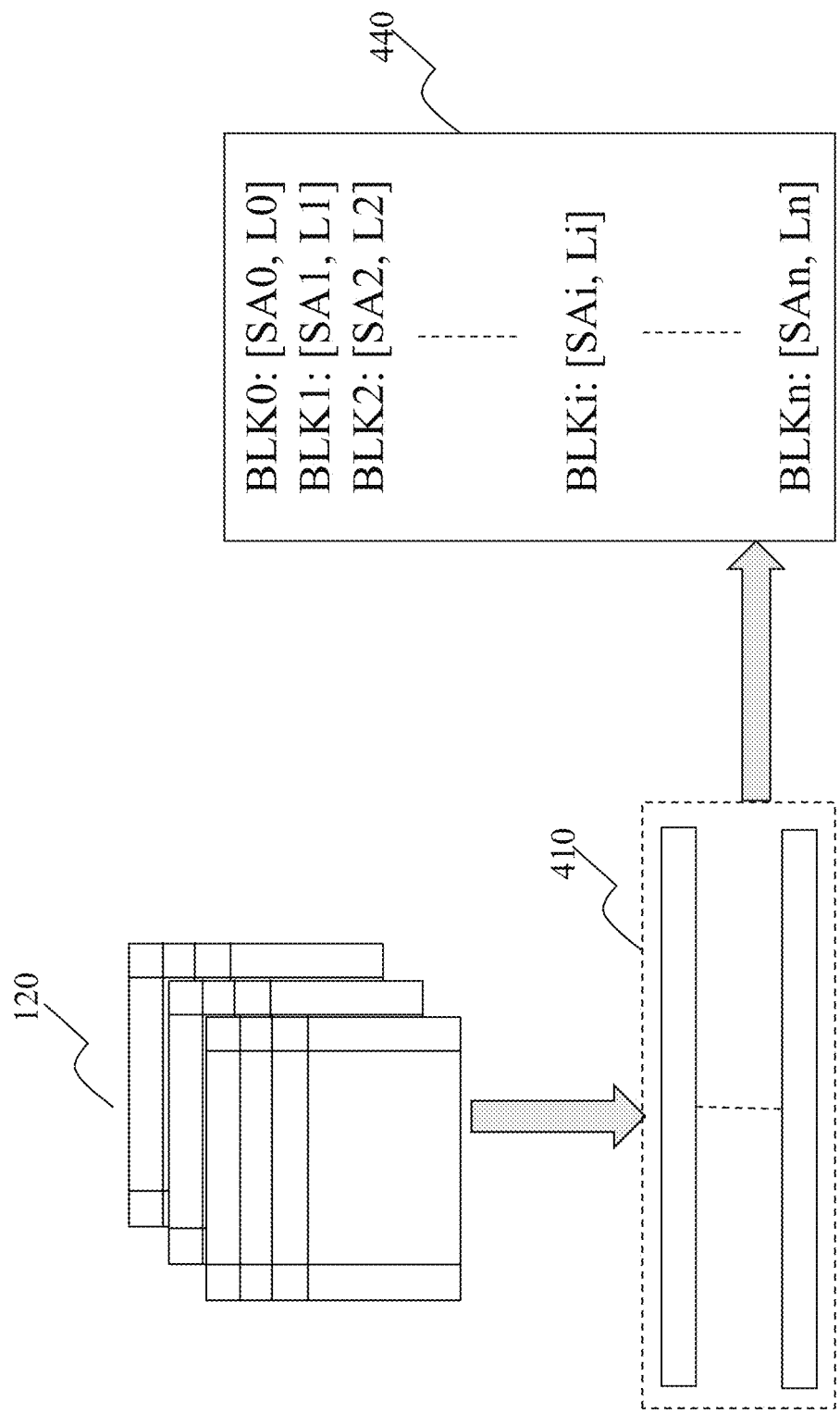
FIG. 4C shows an exemplary compressed representation of an image data, in accordance with an embodiment of the present teaching.

FIG. 4C shows the transformation from the original image data to compressed bitCopy instructions to traverse the image, in accordance with an embodiment of the present teaching. As seen, starting with an image with color frames 120, the bits in the image data are re-organized toa form bit based image data 410, which is then further converted into a series of bitCopy instructions 440 to be used to traverse the entire image in the bit based data space. As seen, while the original image is organized in the conventional way to include 3 color frames, the bit based image as depicted in FIG. 4A stores corresponding color bits from different color frames together in the same reorganized frame. The bitCopy instructions is much compressed as compared with the original image data. As such, reading them by the data transfer unit 320 is fast. In combination with the design to map the address of bit reading on the bus, it makes the data transfer unit 320 read fast keeping up with the clock cycles of the refresh processor 340.

Figure 6:
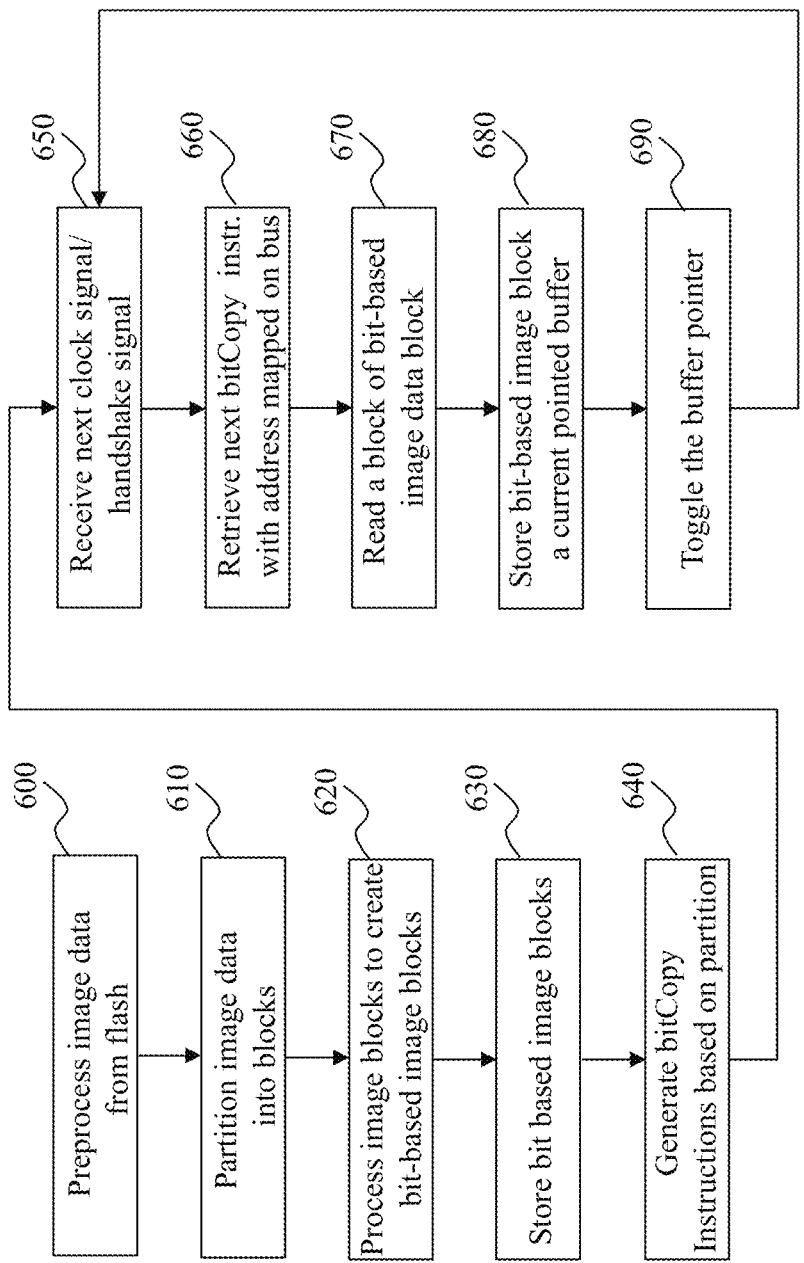
FIG. 6 is a flowchart of an exemplary process of a data transfer unit, in accordance with an embodiment of the present teaching.

FIG. 5 depicts an exemplary high level internal system diagram of the data transfer unit 320, in accordance with an embodiment of the present teaching. In this illustrated embodiment, the data transfer unit 320 comprises an image data partition unit 510, an image data preprocessing unit 520, a partition index generator 550, a bitCopy instruction generator 560, and a bitCopy Unit 580. FIG. 6 is a flowchart of an exemplary process of the data transfer unit 320, in accordance with an embodiment of the present teaching. In some embodiments, there may be a portion of the operation for preprocessing operation and an online portion of the operation in which the data transfer unit 320 coordinates with the refresh processor 340 to deliver on-the-fly LED display. During the preprocessing process, an original image data may be preprocessed for, e.g., special effect, conversion to bit based image data, and generation of bitCopy instructions. Such preprocessed image data facilitates the online processing. The online portion of the operation is an on-the-fly process in which the data transfer unit 320 works in concert with the refresh processor 340 to read the entire image by continuously accessing the next bitCopy instruction, reading the next preprocessed bit based image block according to the bitCopy instruction, and then placing alternately the read image block into one of the buffers.

In FIG. 6, steps in the left column (steps 600-640) correspond to the preprocessing process and steps in the loop on the right column (steps 650-690) correspond to the online process. During the preprocessing phase, the image data partition unit 510 first reads and preprocesses, at 600, the original image data from the storage 310. In some embodiments, the original image may be partitioned, at 610, into different original image blocks for, e.g., facilitating repeated partial reading of image data during the online process. The partitioned image data is then processed, at 620, by the image data preprocessing unit 520 to generate the bit based image blocks (according to what is described in FIGS. 4A-4B). Such preprocessed bit based image blocks are stored in an internal SRAM storage 530. Each bit based image block stored in the internal SRAM, there is a corresponding starting address to locate the block and a length associated with the bit based image block. Such information associated with each block may be transmitted to the partition index generator 550 to facilitate the generation of bitCopy instructions.

Based on the image data partition information and the starting address and length information associated with each bit based image block, the partition index generator 550 creates, at 630, an index for each of the bit based image blocks. Each index for a corresponding bit based image block may include an ID for the block, a starting address in the storage 530 where the block starts, and a length or a number of bits occupied in the storage 530. Based on such indices, the bitCopy instruction generator 560 generates, at 640, bitCopy instructions that can be used during the online process to read the bit based image blocks. In some embodiments, each bitCopy instruction may be directed to one bit based image block and when it is executed, it enables the bit based image block to be read out from the storage 530. In some embodiments, it is also possible to have each bitCopy instruction to read more than one bit based image blocks. The size of the buffer may be adjusted to accommodate multiple bit based image blocks. The specific way to encode the image data via bitCopy instructions may be application dependent. In the disclosure below, it is assumed that each bitCopy instruction is for reading one bit based image block. However, such an assumption is merely for illustration, rather than limitation, and does not limit the scope of the present teaching.

Although the preprocessing operation is discussed to correspond to an offline process, i.e., it is completed prior to the online processing starts, it may also be possible that the preprocessing is carried out also as a part of an online operation, i.e., it is performed on-the-fly. That is, the image preprocessing as described herein (reorganizing the bits in the original image data in accordance what is disclosed in FIGS. 4A-4B) and the generation of bitCopy instructions may also be carried out on-the-fly. Such a working mode is also a part of the present teaching even though it may require additional coordination and/or clock/handshake management to ensure that the preprocessing and bitCopy instruction generation may keep up with the speed of refreshing and display speed of the LED screen. The discussion below focuses the online process involving bitCopy operation, refreshing, and displaying. It is merely for illustration rather than limitation and should not be construed to limit the scope of the present teaching.

As discussed herein, the on-the-fly process requires synchronization between the data transfer unit 320 and the refresh processor 340 based on either a handshake protocol or a commonly shared clock. The online process is an iterative process. From the perspective of the data transfer unit 320, in each cycle, the bitCopy unit 580 acts on each of the generated bitCopy instructions, maps the starting address indicated in each of the bitCopy instructions on the bus 540, and retrieves (from the internal SRAM 530) a bit based image block via hardware operation, and places the retrieved bit based image block in one of the alternate buffers. As shown in FIG. 6, the bitCopy unit 580 first receives, at 650, a next synchronization signal (handshake signal or a clock signal CLK). Acting on the synchronization signal, the bitCopy unit 580 retrieves, at 660, the next bitCopy instruction and maps the starting address and length (from the bitCopy instruction) on the bus 540. This enables the bitCopy unit 580 to read, at 670, the bit based image block from SRAM 530 via hardware and then store, at 680, the read bit based image block in one of the two buffers 330 based on the current buffer pointer 570. Once the bit based image block is saved in the buffer, the bitCopy unit 580 toggles, at 690, the buffer pointer 570 so that it now points at the alternate buffer. Once that is done, the online process proceeds to step 650 to start the next cycle. The process continues until the entire image is retrieved.

Figure 7:
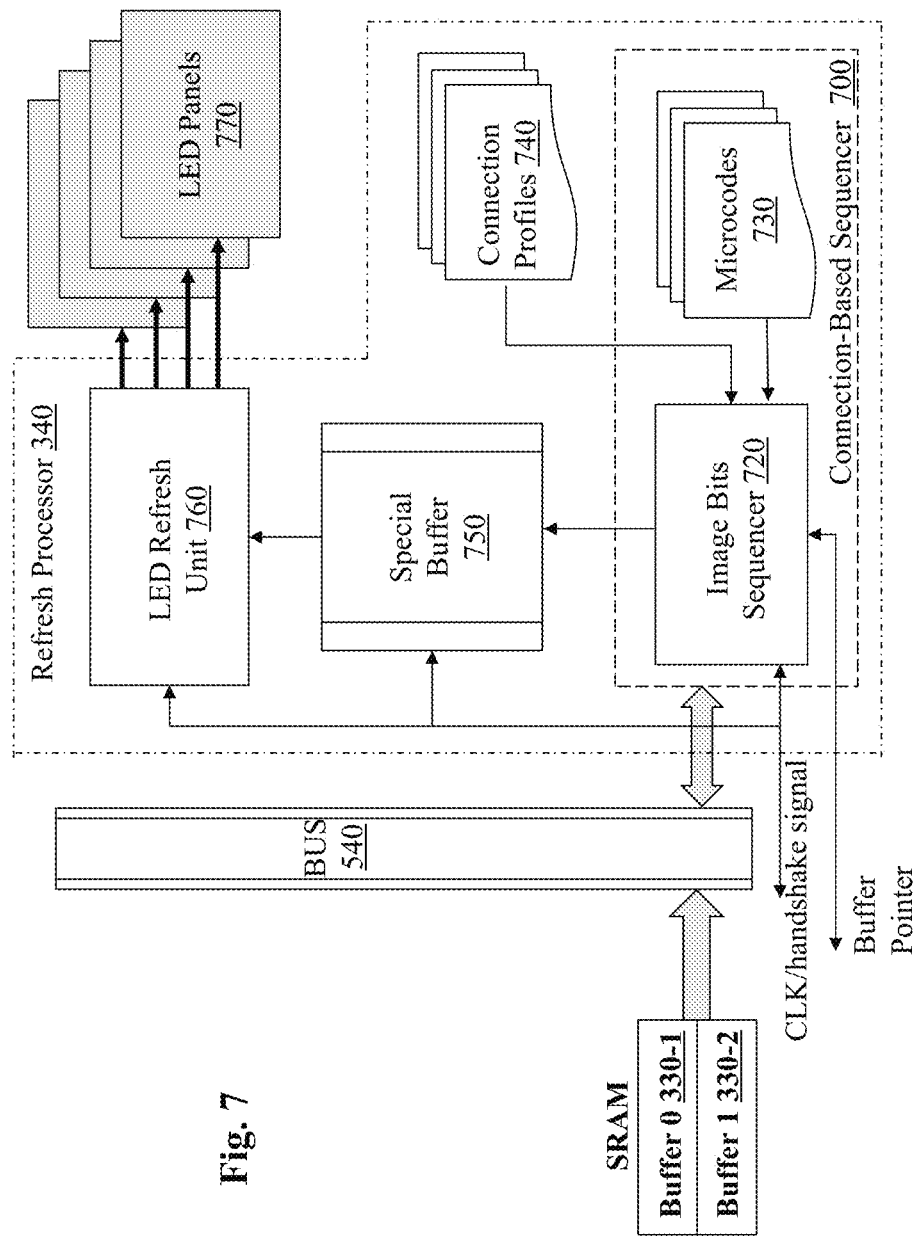
FIG. 7 depicts an exemplary high level system diagram of a refresh processor, in accordance with an embodiment of the present teaching.

As discussed herein, during the online process, the refresh processor 340 works with the data transfer unit 320 in concert by retrieving the bit based image blocks stored in the alternate buffers 330-1 and 330-2 (see FIG. 3), transform the data in each bit based image block into signals that may be used to refresh the lights associated with pixels on the LED screen to achieve the display effect dictated by the image content. FIG. 7 depicts an exemplary high level system diagram of the refresh processor 340, in accordance with an embodiment of the present teaching. In this illustrated exemplary embodiment, the refresh processor 340 interfaces with the buffers 330 via the bus 540 and the LED display panels 770. Internally, the refresh processor 340 comprises a connection-based sequencer 700, a special buffer 750, and an LED refresh unit 760. The connection-based sequencer 700 is provided to re-arrange the bits in a bit based image block based on how the unit panels are connected so that the lights associated with the pixels on the LED screen may be appropriately refreshed in a consistent manner. The special buffer 750 is a list storing result from the connection-based sequencer. The input to 750 is provided according to the sequence of column signals. The output is arranged in a manner that all columns need to output 1-bit at each clock cycle. For example, the order of bits from 700 to be input to 750 is: 32-bits of column 0, 32-bits of column 1, 32-bits of column 2, . . . , 32-bits of column N. The output of 750 is in the order of: bit31 of all columns, bit 30 of all columns, bit 29 of all columns, . . . , bit0 of all columns. The stored image information may then be used by the LED refreshing unit 760 to transform into control signals based on the image content, i.e., the color representation of the pixels in the image.

The connection-based sequencer 700 comprises an image bits sequencer 720, which takes bits in a bit based image block from an alternate buffer (based on the buffer pointer) as input and produces a series of bits arranged appropriately with respect to the connection pattern. To re-arrange the bits, the image bits sequencer 720 may sequence the bits or microcodes retrieved from storage 730 may be execute for that purpose. The microcodes used for sequencing the bits may be determined based on information stored in 740 that signifies a specific connection pattern of the current LED display screen. Such information is used to select the microcodes to be used to sequence the image bits. In some embodiments, storage 740 may store different connection profiles. Storage 730 may store different corresponding microcodes, each of which may be provided to support some connection profiles. In operation, information may be set in storage 740 to indicate the current connection pattern and such information may be used to activate a corresponding set of microcodes for appropriately processing the image bits from a buffer in a manner consistent with the connection pattern. FIGS. 8A-15B show various exemplary ways to re-sequence bits in different circumstances.

Figure 8A:
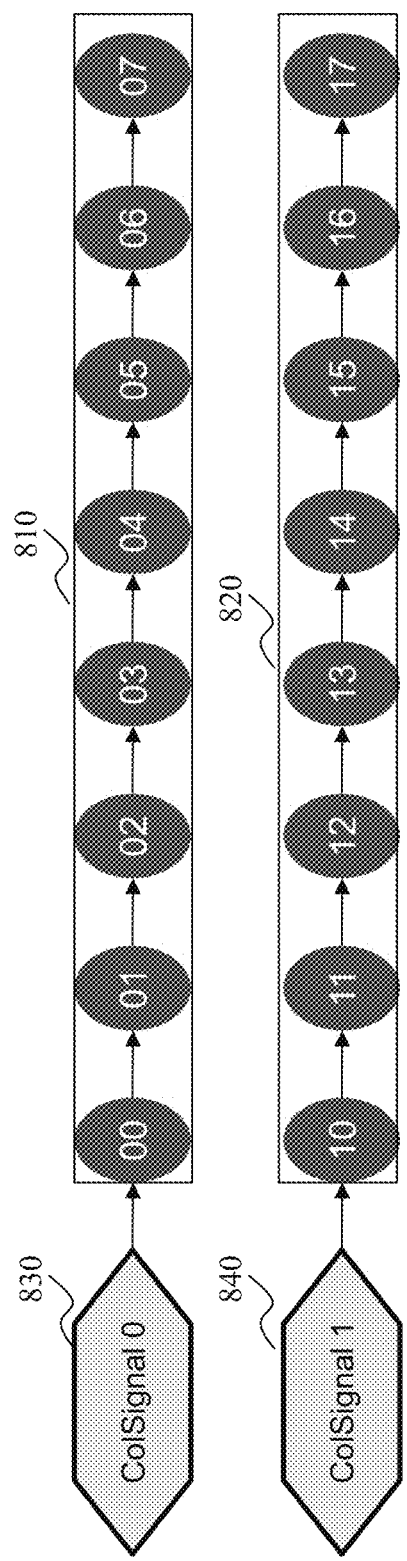
FIG. 8A shows different rows of pixels on an LED panel in a single color being driven individually by different column signals, in accordance with an embodiment of the present teaching.
Figure 8B:
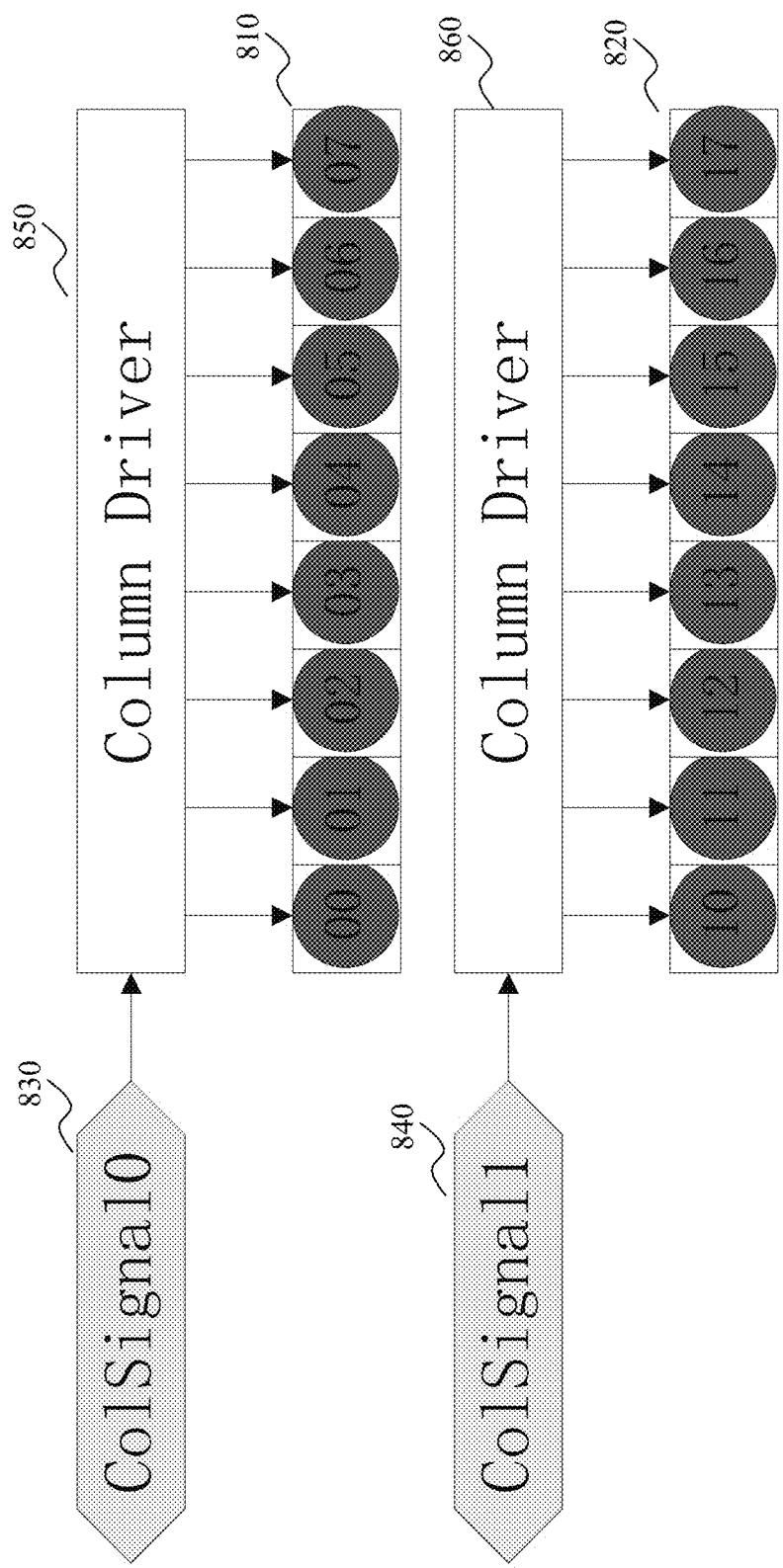
FIG. 8B shows a representation of different rows of pixels on an LED panel in a single color being driven individually by different column drivers, in accordance with an embodiment of the present teaching.

FIG. 8A shows two different rows of single color pixels on an LED panel being driven individually by different column signals, in accordance with an embodiment of the present teaching. There are two rows of 8 pixels, row 810 with pixels 00-07 and row 820 with pixels 10-17. In this configuration, each of the rows is driven by a separate column signal, respectively. That is, column signal 0 830 drives the pixels 00-07 in the first row 810 on an LED screen and column signal 1 840 drives pixels 10-17 in the second row 820 on the same display screen. FIG. 8B shows a different representation of the same where each column signal is driven through each row by a separate column driver, in accordance with an embodiment of the present teaching. In this representation, although the column driver 850 that sends column signal 0 830 to pixels 00-07 via separate lines, such lines may represent the pins of a chip and they may be connected internally in the driver so that the effect is the same as what is presented in FIG. 8A, i.e., the column signal 0 830 flows from pixel 00 to 01 to 02, . . . , to 07 in a serial manner. The similar can be said about how the column driver 860 delivers column signal 1 840 to each of the pixels 10, 11, 12, . . . , 17. When each row is driven by a separate column signal, as shown in FIGS. 8A and 8B, bits read from alternate buffers do not need to be re-sequenced.

In most LED display operations, a column signal drives through pixels across multiple rows. To deliver a column signal to pixels across different rows, the column signal needs to traverse pixels in an LED display screen formed by multiple LED unit panels in a manner consistent with both how pixels inside each unit panel are linked and how LED unit panels are connected to form a larger LED display screen. Depending on the connection pattern, a column signal will traverse pixels differently. Because of that, the bits of the image data need to be sequenced accordingly to accommodate the connection pattern.

Figure 9A:
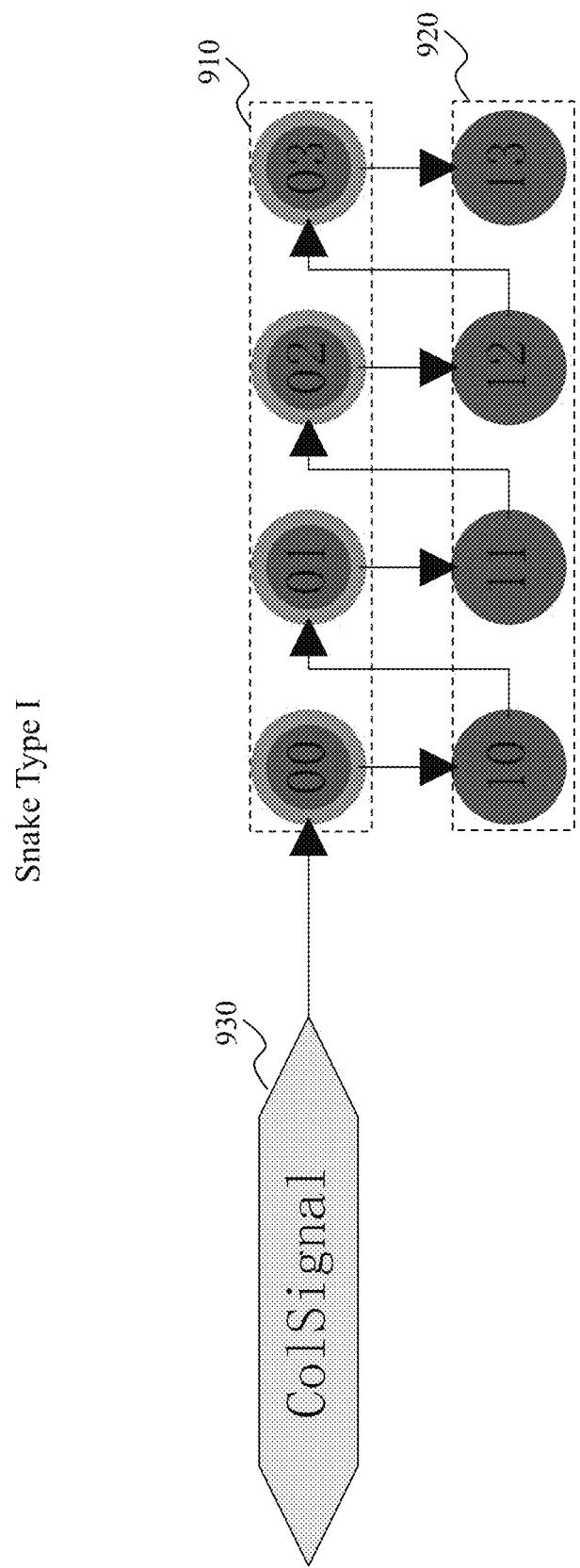
FIG. 9A shows a column signal driving different rows of pixels with a single color via a snake type I connection, in accordance with an embodiment of the present teaching.
Figure 9B:
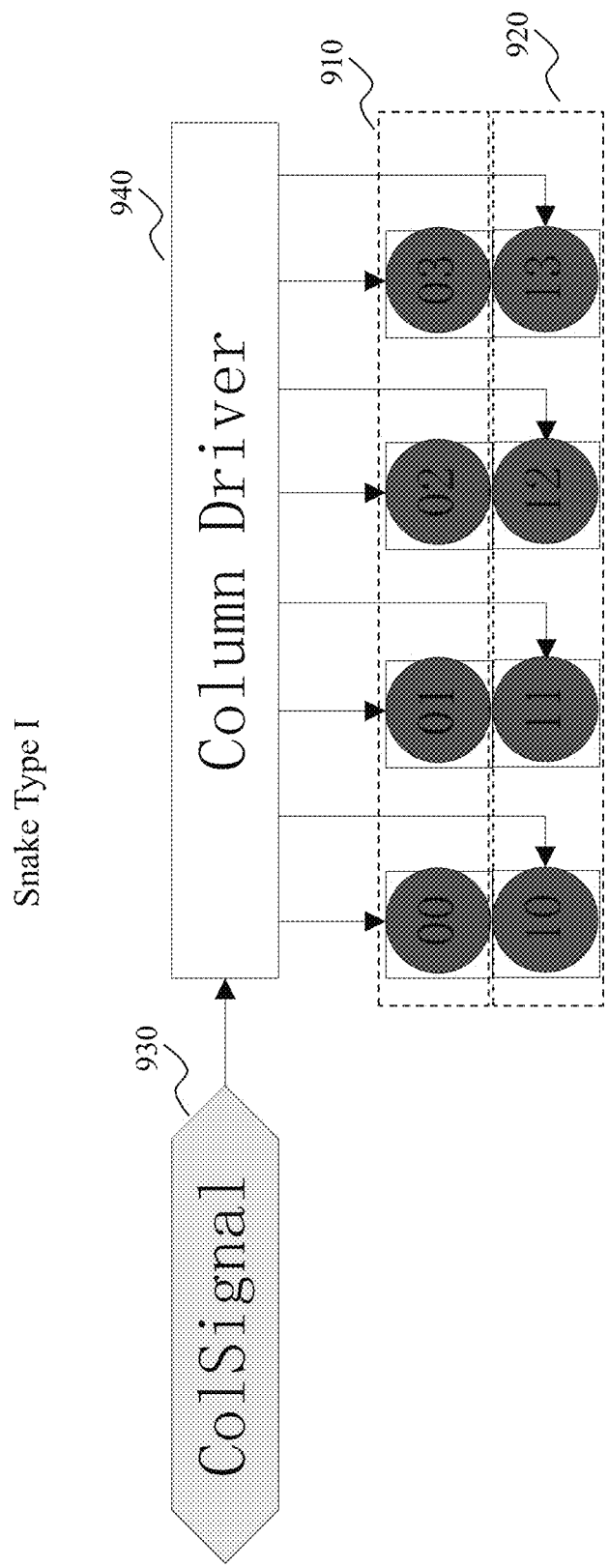
FIG. 9B shows a representation of a column driver in a snake type I wiring for driving different rows of pixels, in accordance with an embodiment of the present teaching.

FIG. 9A shows a column signal driving two rows of pixels in a single color via a snake type I connection, in accordance with an embodiment of the present teaching. As seen, there are two exemplary rows of pixels 910 (with pixels 00-03) and 920 (with pixels 10-13) and all pixels are single colored. A column signal 930 is used to drive pixels in both rows in a connection pattern called snake type I, by which the column signal 930 starts from the top row and flows from first pixel 00 in the first row 910 to first pixel 10 in the second row 920, and back to first row to flow to second pixel 01, and to the second pixel 11 in the second row 11, back to the first row again to drive the third pixel 02, back down to the third pixel 12 of second row 920, . . . , etc. FIG. 9B shows a different representation of snake type I connection in driving a column signal to traverse two rows of pixels of a single color, in accordance with an embodiment of the present teaching. The column signal 930 is driven by a column driver 940 to the pixels. As seen, there are different links from the column driver 940 to different pixels. Form the left most link to the right most link from the column driver, the order of traversing the pixels are 00, 10, 01, 11, 02, 12, . . . , and 13, identical to what is presented in FIG. 9A.

Figures 9C, 9D:
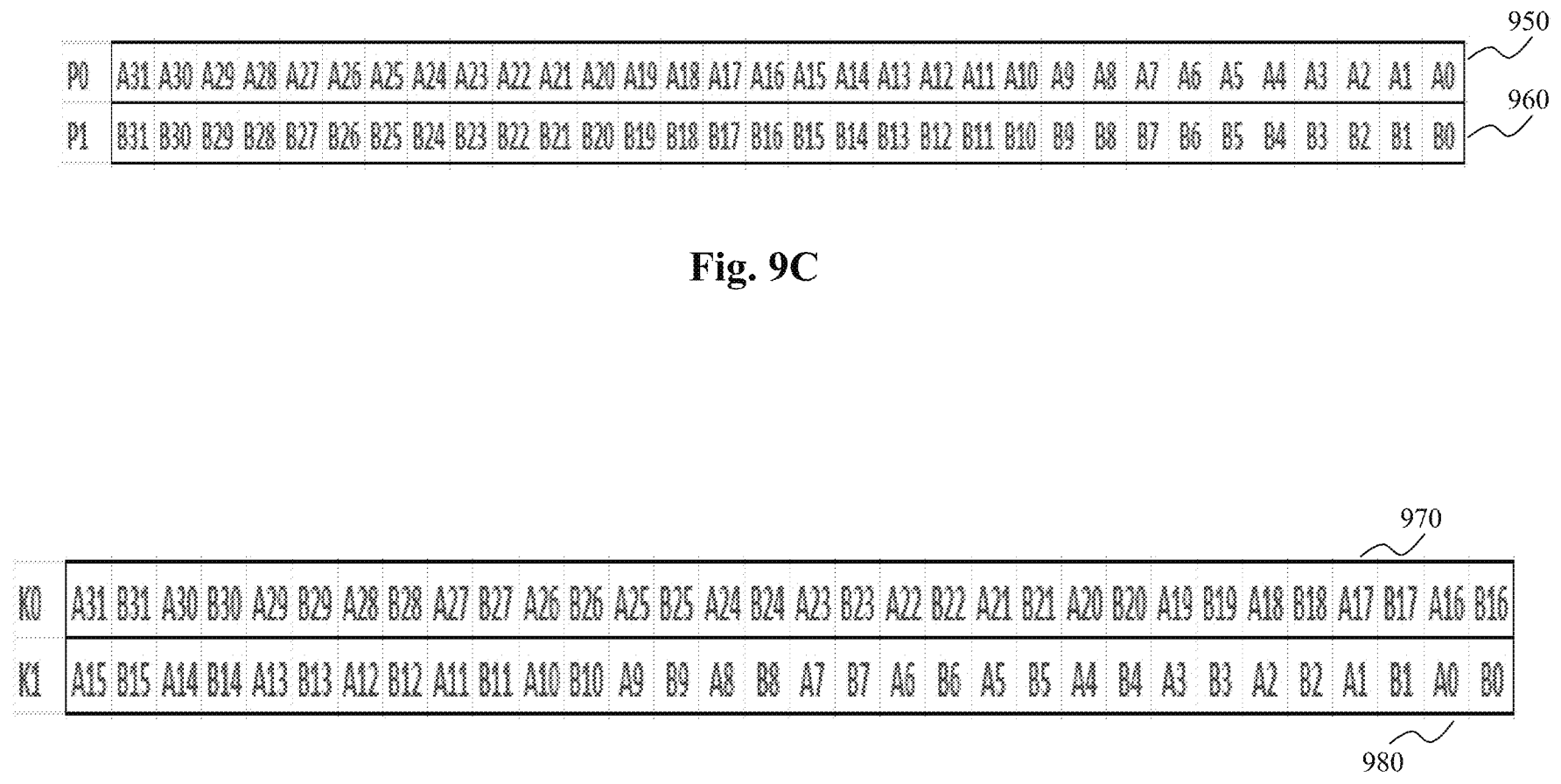

To facilitate such a traversing order, the bits in the bit based image block read from the alternate buffers 330 may need to be re-sequenced. This is illustrated in FIGS. 9C and 9D. FIG. 9C shows content in registers when two rows of bit based image data in a single color is loaded, in accordance with an embodiment of the present teaching. As illustrated, the first row is P0 950 and the second row is P1 960. In this example, the first row has 32 bits starting from A31 as, e.g., the most significant bit, to A0 as, the least significant bit. The second row also has 32 bits starting from B31 as, the most significant bit, to B0 as, the least significant bit. If the connection pattern is snake type I, then along the traverse path, the sequence of bits will be A31, B31, A30, B30, A29, B29, . . . , A1, B1, A0, and B0. This is derived by traveling starting from the first bit in the first row, down to the first bit in the second row, back to the second bit in the first row, to the second bit in the second row, . . . . Thus, to satisfy this traverse path due to snake type I connection pattern, the bits in 950 and 960 need to be re-sequenced to generate re-sequenced bit stream as shown in FIG. 9D, which shows the result of sequencing the bits in 950 and 960 to facilitate snake type I connection, in accordance with an embodiment of the present teaching.

Figure 10A:
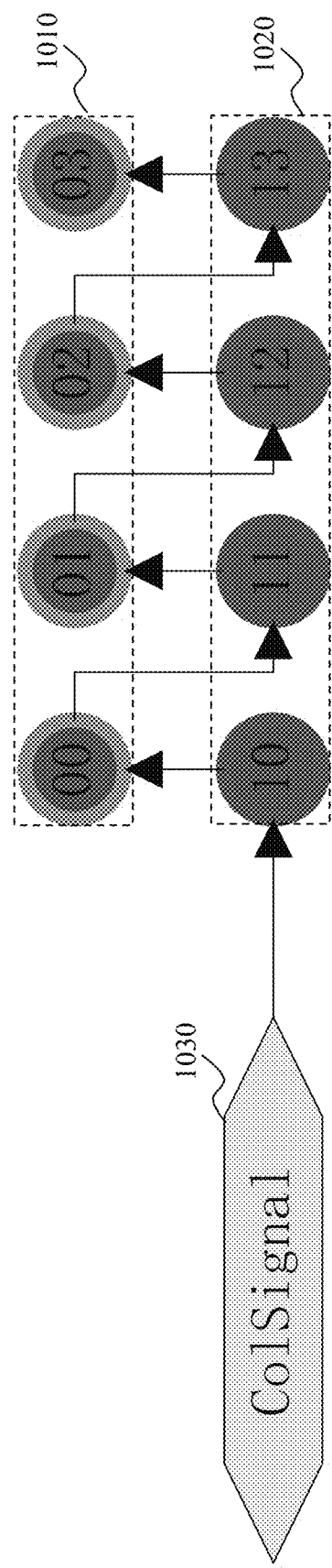
FIG. 10A shows a column signal driving different rows of pixels in a single color via a snake type II connection, in accordance with an embodiment of the present teaching.
Figure 10B:
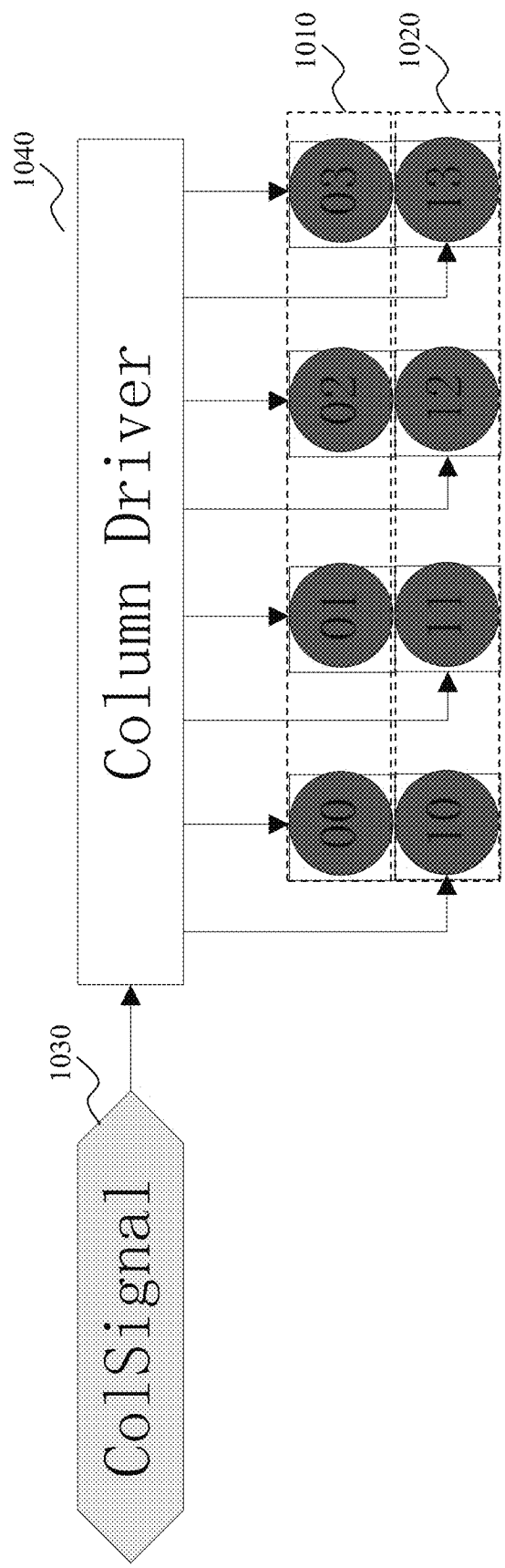
FIG. 10B shows a representation of a column driver for driving different rows of pixels in a single color via a snake type II wiring, in accordance with an embodiment of the present teaching.

As can be seen below, when the connection pattern changes, the bits in the same registers 950 and 960 need to be sequenced differently in order to accommodate the connection pattern. FIG. 10A shows a connection pattern called snake type II, in accordance with an embodiment of the present teaching. With this connection pattern, the column signal 1030 traverses pixels starting from the first pixel 10 in the second row 1020 to the first pixel 00 of the first row 1010, back to the second pixel 11 in the second row 1020 and to the second pixel 01 in the first row 1010, then back again to the second row 1020 to the third pixel 12, and return to the third pixel 02 of the first row 1010, . . . . FIG. 10B shows a different representation with a column driver 1040 for driving the column signal 1030 via a snake type II connection, in accordance with an embodiment of the present teaching. As shown, for two rows 1010 and 1020, the column driver 1040 as links to different pixels in different rows. Starting from the left most link from the column driver 1040, it delivers the column signal 1030 to pixel 10 in the second row 1020, to pixel 00 in the first row 1010, to the second pixel 11 in the second row 1020, to the second pixel 01 of the first row 1010, etc. with the same traverse order as what is shown in FIG. 10A. When the connection pattern changes, bits are traversed in a different order. To accommodate that, image bits from a bit based image block also need to be sequenced differently.

FIG. 10C shows image bits re-arranged based on the image content shown in FIG. 9C when the wiring connection pattern is snake type II, in accordance with an embodiment of the present teaching. Consistent with the traversal order according to snake type II connection, the bits as shown in FIG. 10C are now in an order of B31, A31, B30, A30, B29, A29, . . . , B1, A1, B0, and A0. This result may be obtained via different ways to re-arrange the bits loaded from the SRAM 330. One is via sequencing performed by the image bits sequencer 720. That is, for each connection type, there is a different sequencing operation to re-arrange the bits in a way that is appropriate for the connection type. Another way is to execute a suitable set of microcodes corresponding to the connection type. Yet another different way is to combine the sequencing and microcodes. For example, the image bits sequencer 720 may be provided to sequence the image bits according to snake type I connection. If the actual connection type is snake type II, microcodes may be executed based on the sequenced result in snake type I connection to rearrange the bits in snake type I arrangement to achieve other connection types. As seen, to convert from snake type I bit arrangement to snake type II arrangement, a simple operation of flipping the order of each pair of bits will achieve the conversion.

Figure 11A:
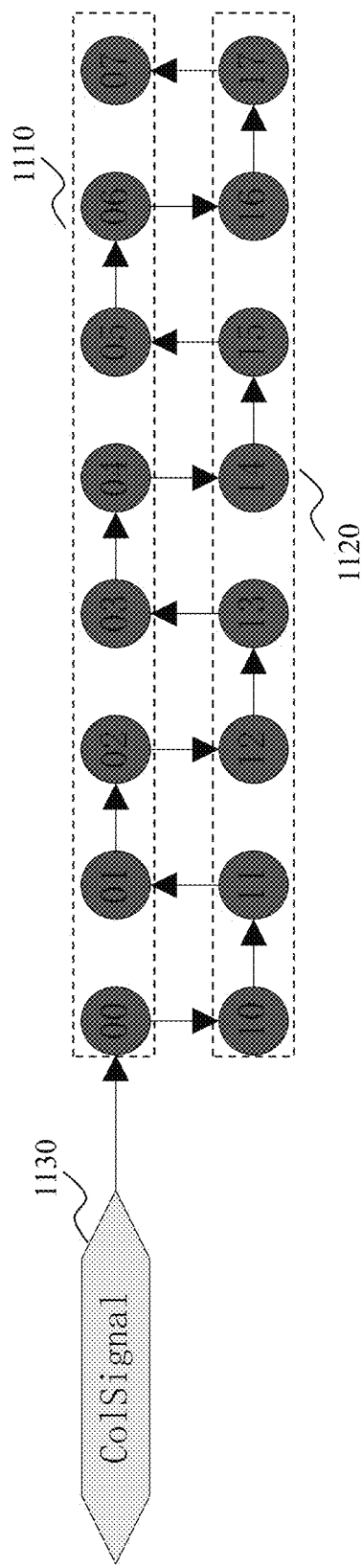
FIG. 11A shows a column signal driving different rows of pixels in a single color via a snake type III connection, in accordance with an embodiment of the present teaching.
Figure 11B:
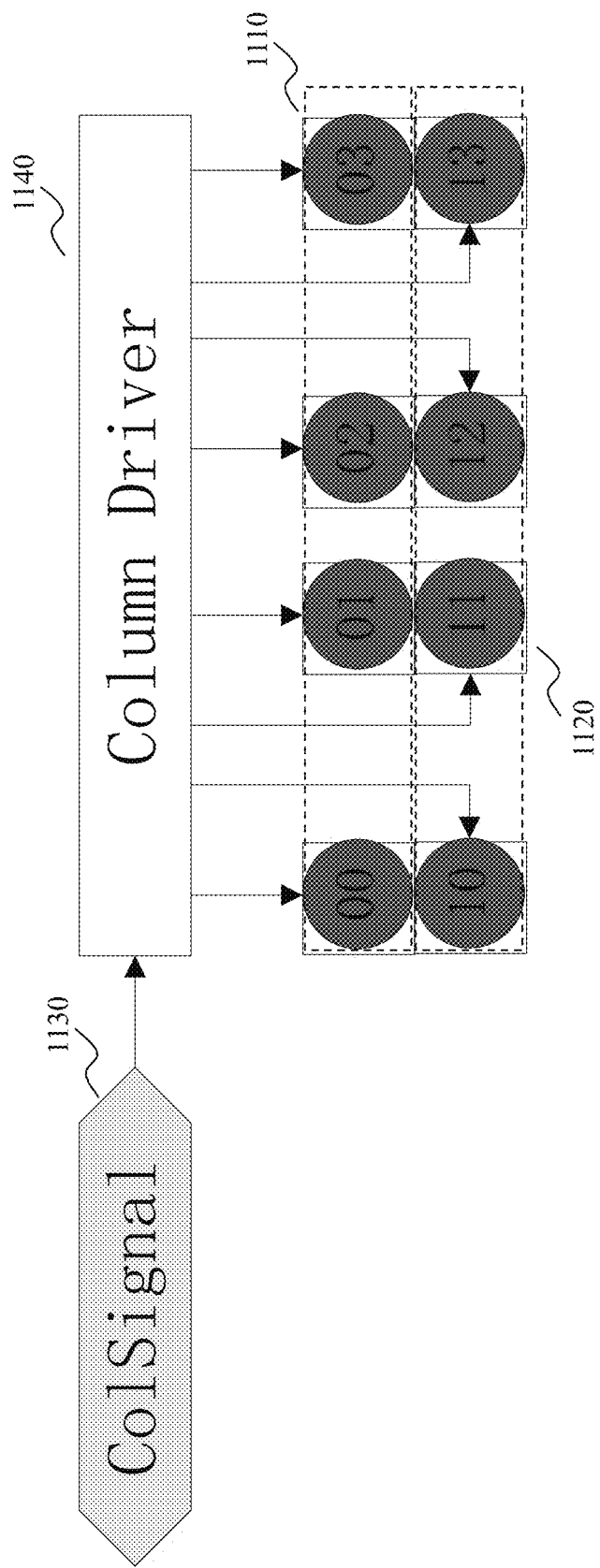
FIG. 11B shows a representation of a column driver for driving different rows of pixels in a single color via a snake type III wiring, in accordance with an embodiment of the present teaching.

FIG. 11A shows a connection pattern called snake type III, in accordance with an embodiment of the present teaching. As shown therein, there are two rows of pixels 1110, and 1120, both driven by the same column signal 1130 with a traverse path going through pixels in the order of first pixel 00 of the first row 1110, to the first pixel in the second row 1120, to the second pixel 11 in the same second row 1120, back to the second pixel 01 of the first row 1110, to the third pixel 02 of the same first row 1110, to the third pixel 12 of the second row 1120, and again the fourth pixel 13 of the same second row 1120, . . . , until all pixels of both rows traversed in this connection pattern. FIG. 11B shows a different representation of the snake type III connection with a column driver driving through pixels in different rows with this connection pattern, in accordance with an embodiment of the present teaching. The links from the column driver starting from the left most link sends the column signal 1130 to pixel 00 in the first row 1110, to pixel 10 of the second row 1120, to pixel 11 of the same second row 1120, and then to the second pixel 01 of the first row 1110, and to the third pixel 02 of the same first row 1110, . . . , in the same manner as what is shown in FIG. 11A.

Figure 11C:
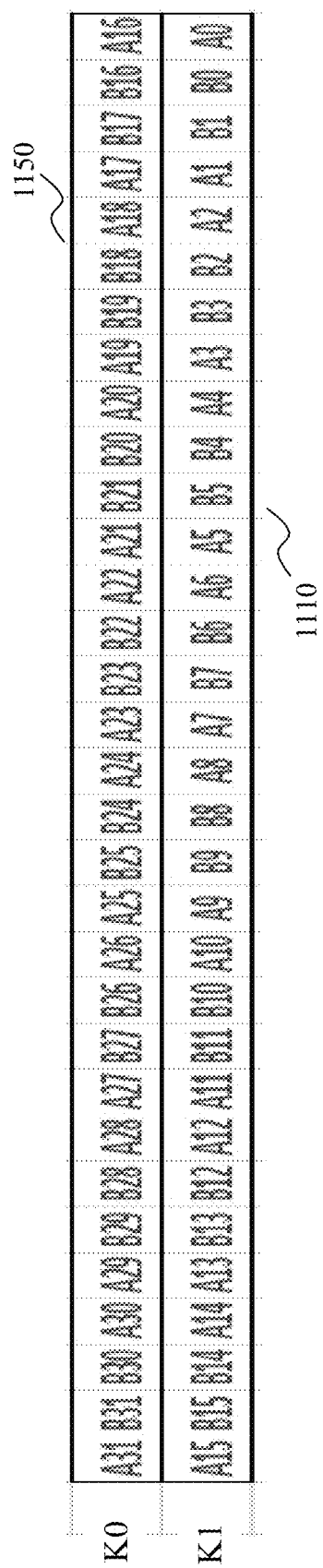
FIG. 11C shows the result of sequencing the bits in registers loaded with pixels of different rows in a single color to facilitate snake type III connection, in accordance with an embodiment of the present teaching.

Similarly, with snake type III connection pattern, bits in a bit based image block from an alternate buffer need to be sequenced as discussed herein according to this connection pattern. FIG. 11C shows the result of sequencing the bits in registers 950 and 960 to facilitate snake type III connection, in accordance with an embodiment of the present teaching. As seen, the original sequence of the bits in registers 950 and 960 as shown in FIG. 9C are now re-sequenced to have the order of A31, B31, B30, A30, A29, B29, B28, A28, A27, . . . , A3, B3, B2, A2, A1, B1, B0, A0. As discussed herein, instead of using the image bits sequencer 720 to sequence the bits according to snake type III connection, another alternative implementation is to have the image bits sequencer 720 to have a fixed function to sequence the bits according to snake type I and then execute appropriate microcodes to converting the bits in snake type I arrangement to a new arrangement suitable for snake type III connection. Another possible implementation is to have the microcodes to do the re-arrangement of the bits loaded from buffer 330 to any desired sequence according to the actual connection type of the LED display panel.

Figure 1B:
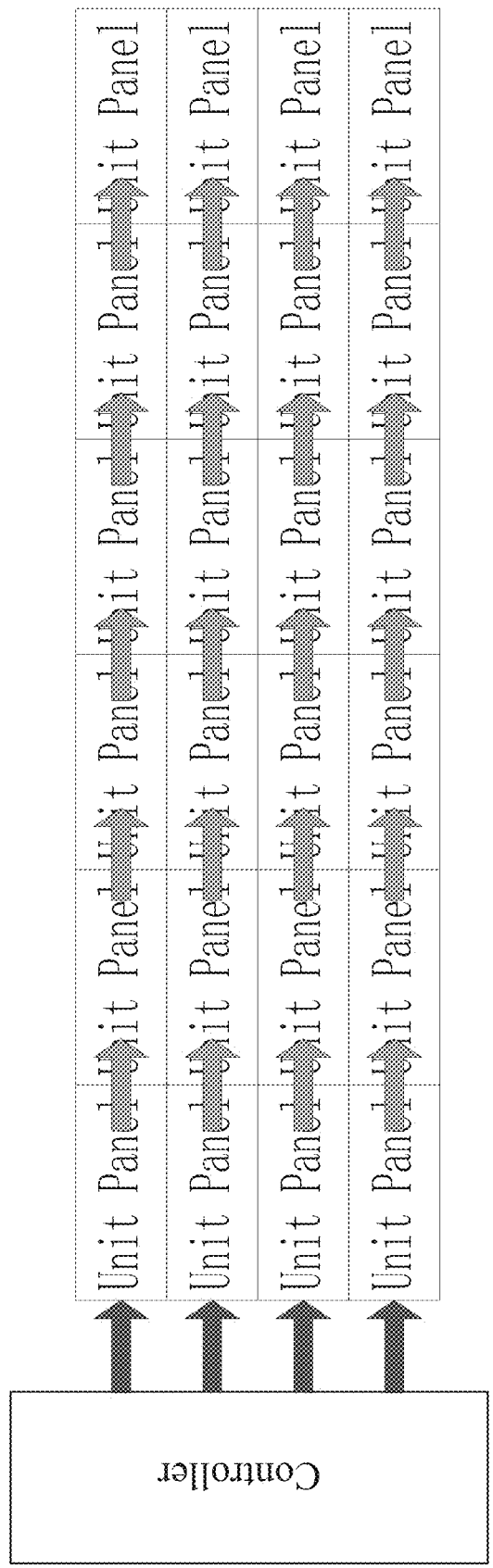
Figure 1C:
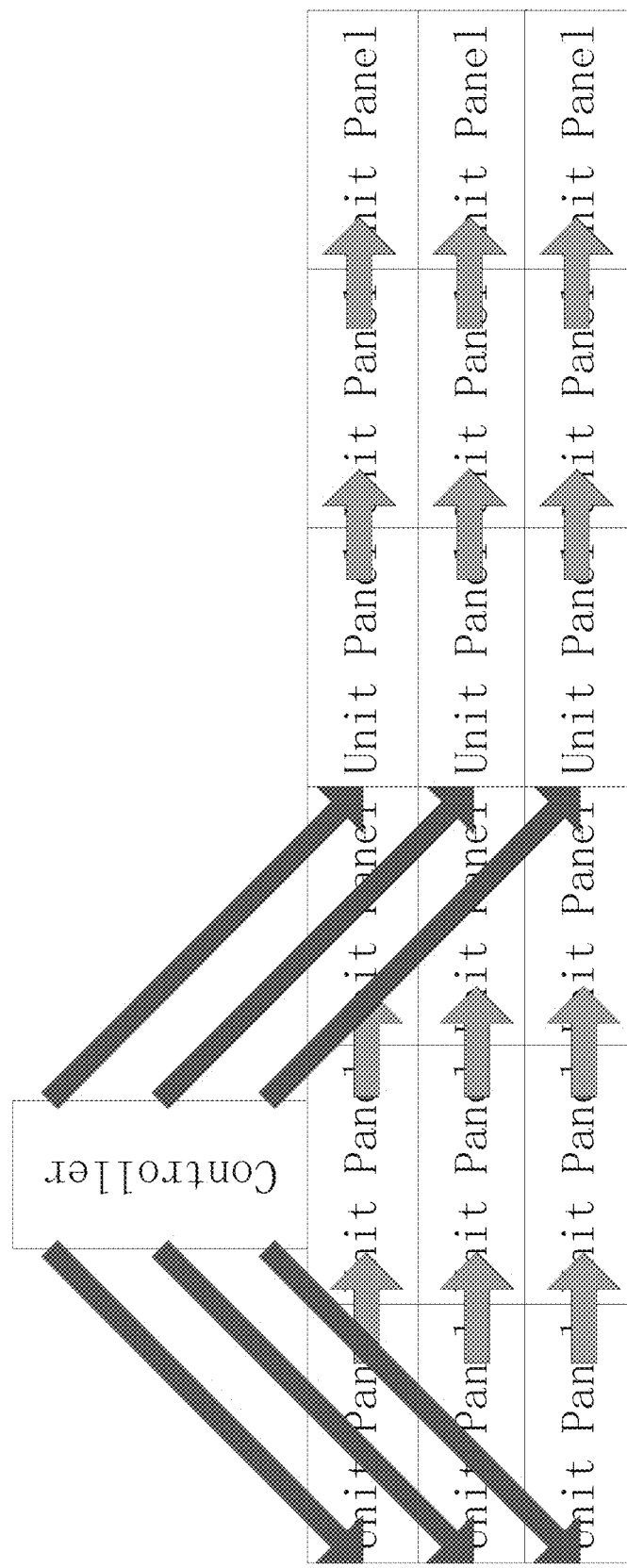
FIG. 1C (PRIOR ART) shows an exemplary way to connect LED unit panels.
Figure 1D:
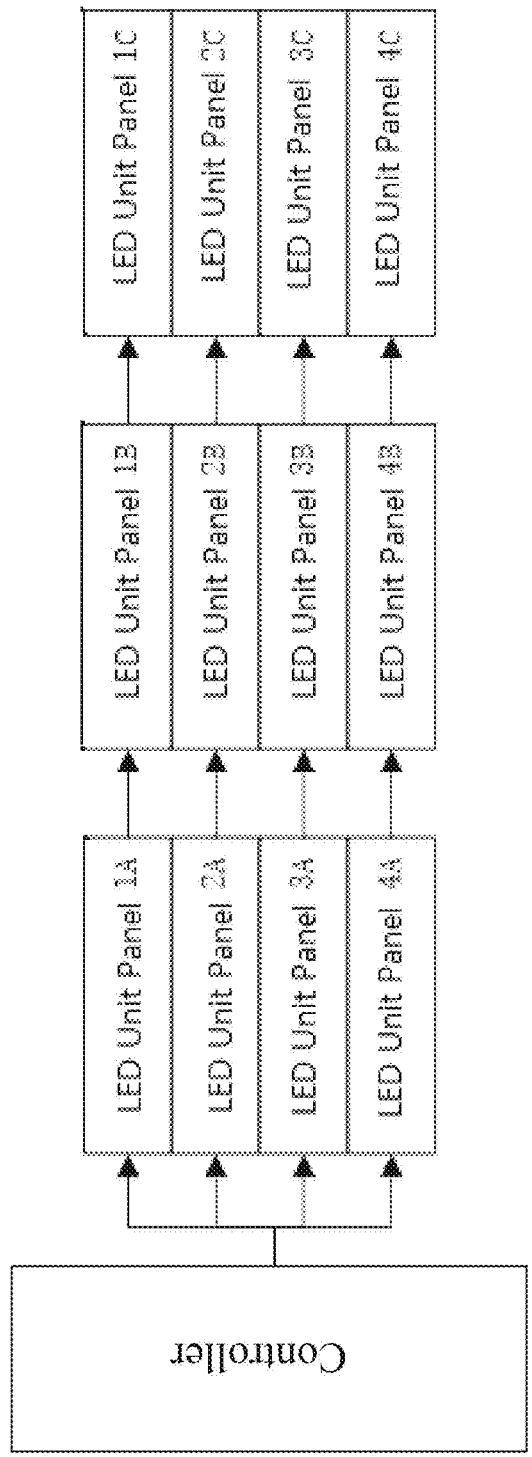
FIG. 1D (PRIOR ART) illustrates row connections of LED unit panels.
Figure 1E:
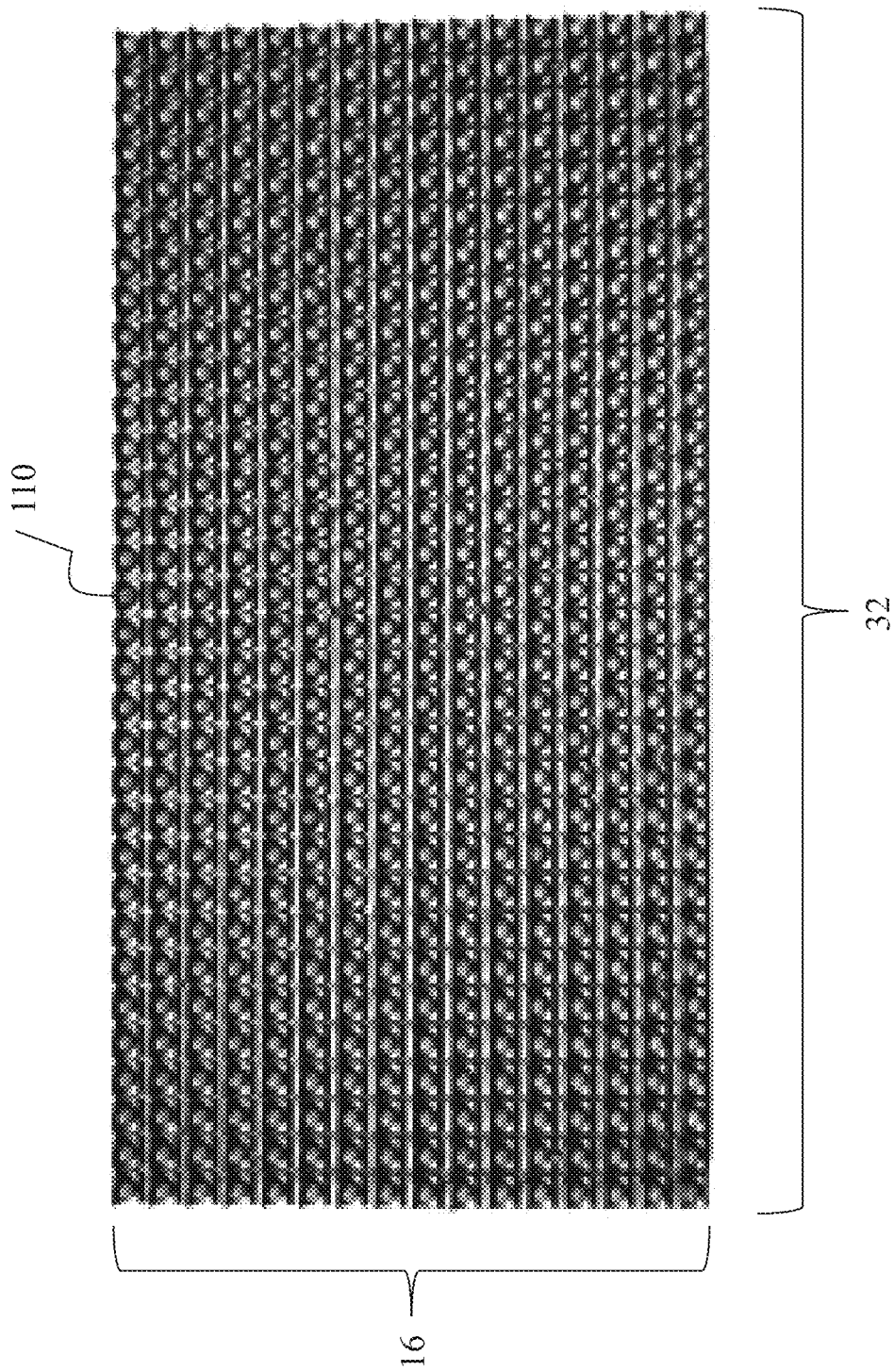
FIG. 1E (PRIOR ART) shows an exemplary LED unit panel with pixels.
Figure 1F:
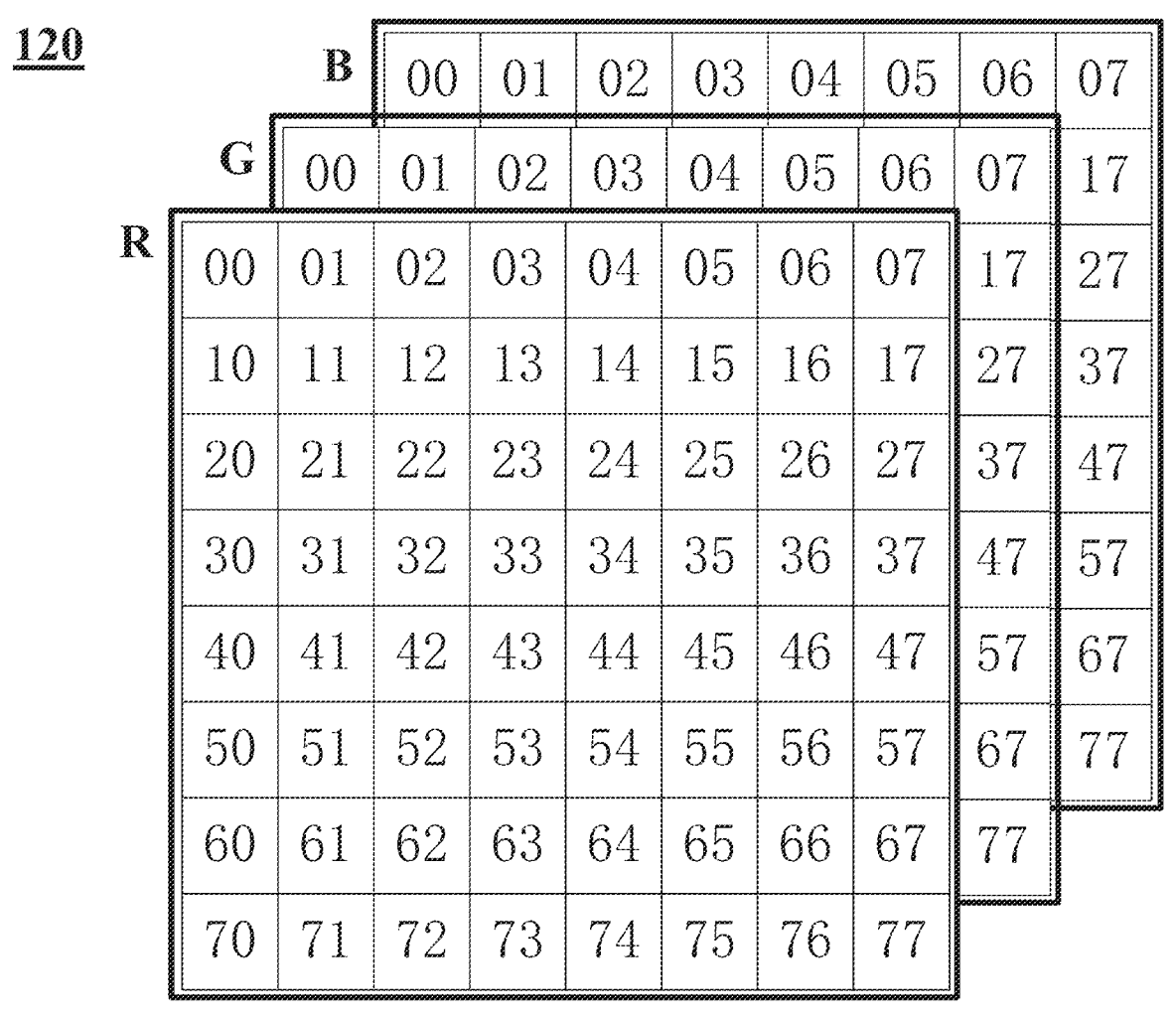
Figure 1G:
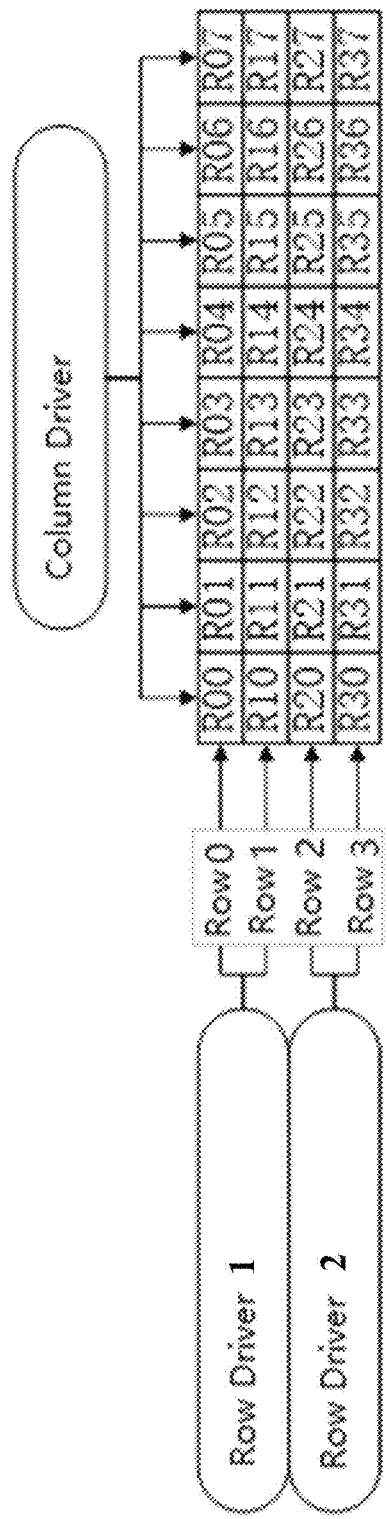
FIG. 1G (PRIOR ART) shows an exemplary way to drive pixels in an LED panel.
Figure 1H:
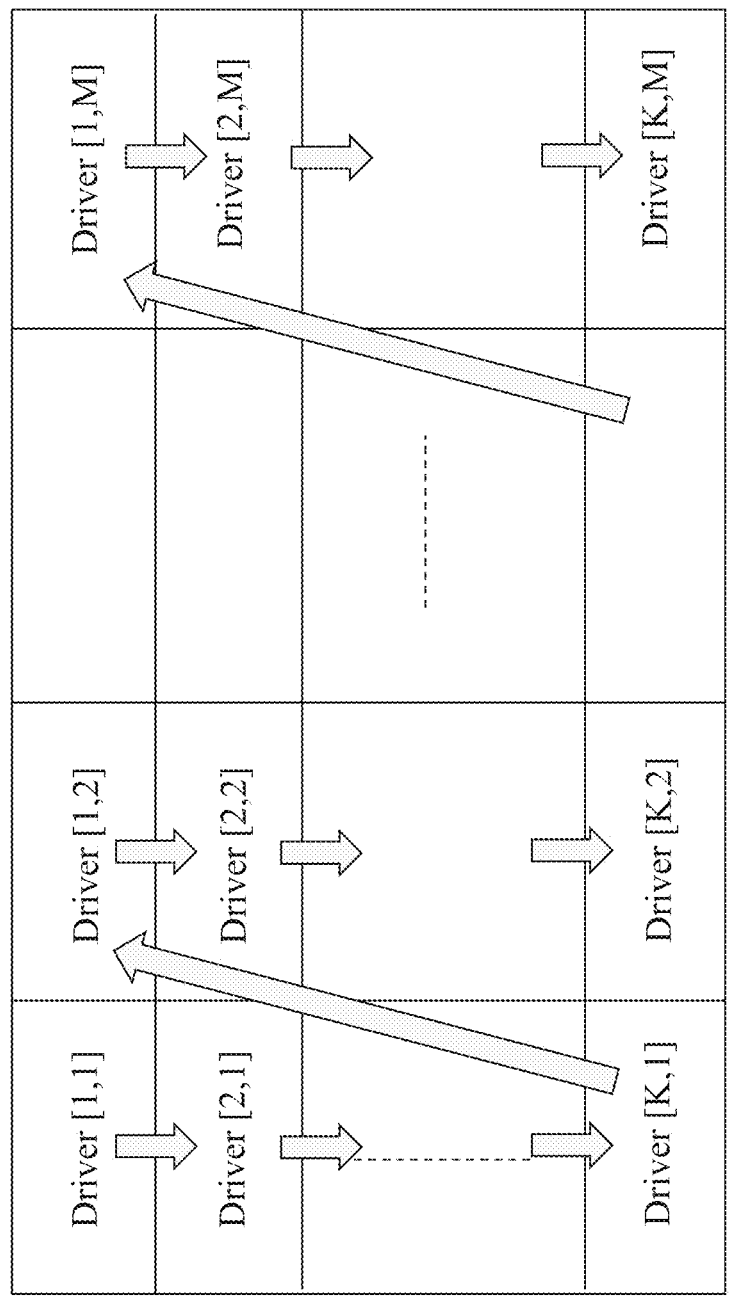
FIG. 1H (PRIOR ART) illustrates an exemplary way to connect LED unit panels.
Figure 2A:
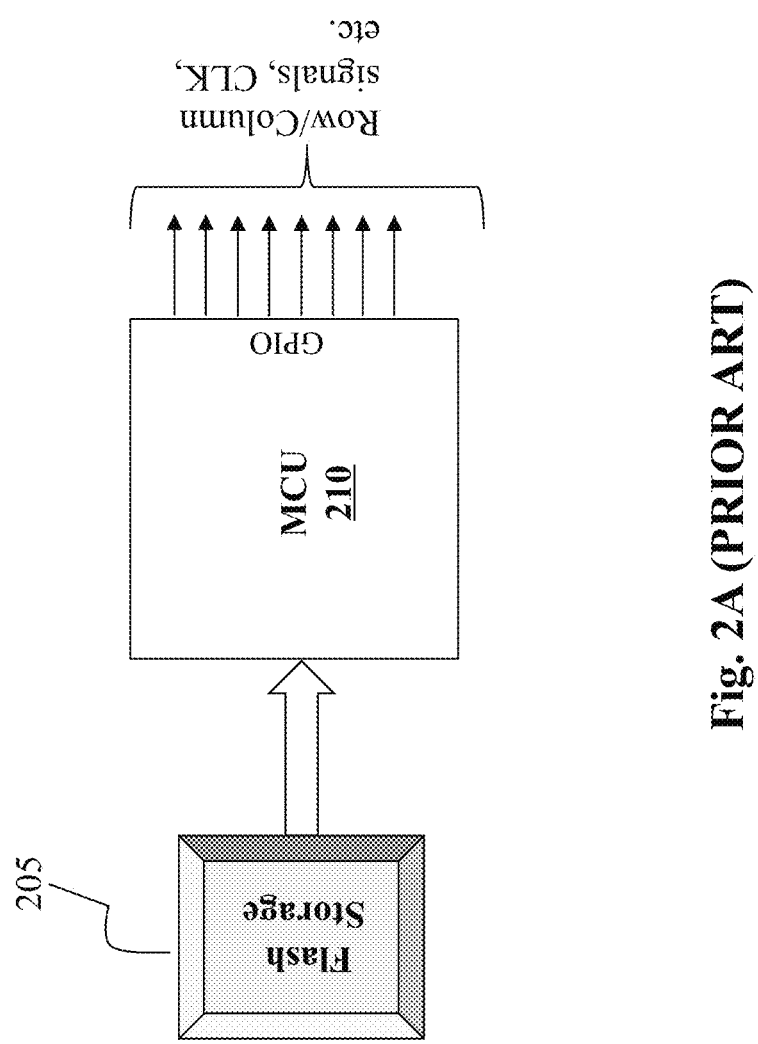
FIG. 2A (PRIOR ART) shows a traditional MCU based implementation of a controller card.
Figure 2B:
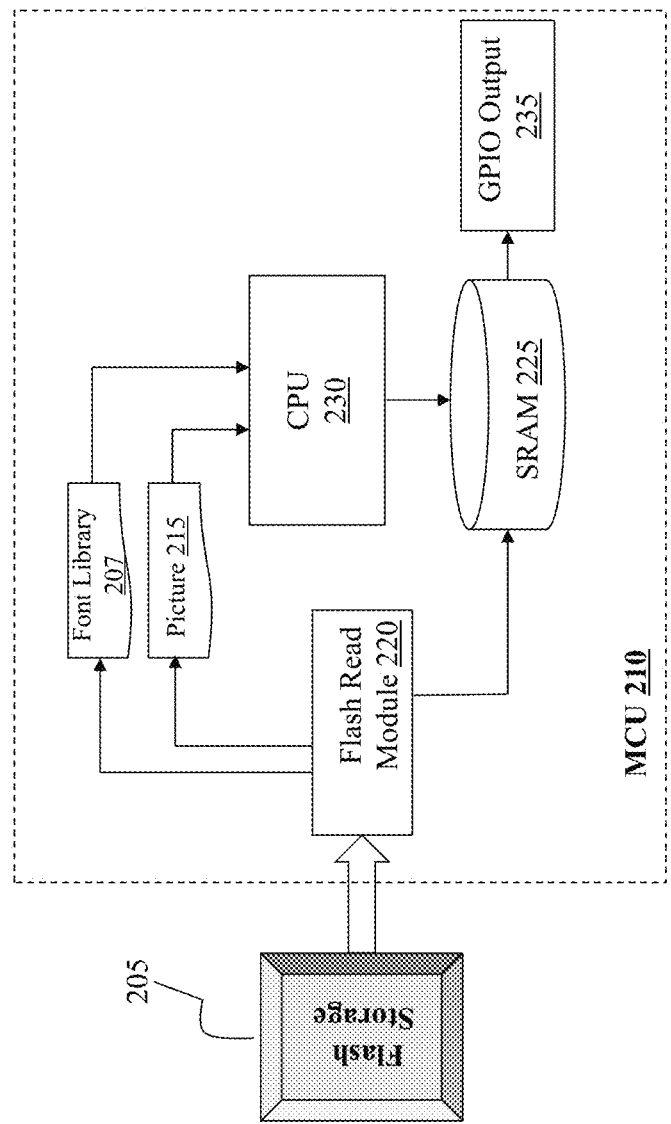
FIG. 2B illustrates an exemplary construct of an MCU as a controller card for LED display.
Figure 2C:
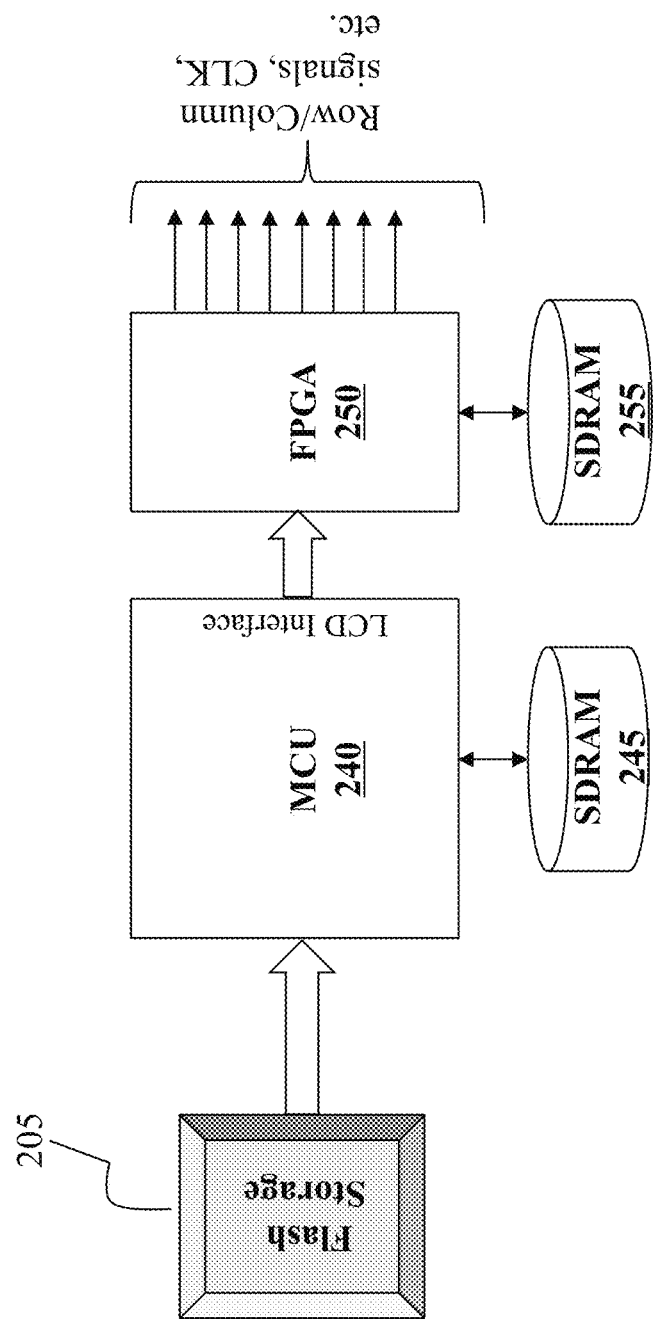
FIG. 2C (PRIOR ART) shows a traditional implementation of a controller card with MCU and FPGA.

The examples above are based on pixels in a single color, i.e., one bit each pixel. In most LED display applications, pixels are colored, some partial and some full color. As discussed herein, when pixels are colored, each pixel has different color components and therefore has more than one bit. For example, a picture may be dual colored with red and green color components. A picture may also be full colored so that each pixel has all three color components, i.e., red, green, and blue. Each color component may have its own intensity, represented by different gray scales represented by bits. Depending on resolution, the number of bits used to represent each color component may vary. It can be a single bit in each color, representing two gray scales, e.g., on and off. There may also be more bits, e.g., 8 bits in each color component representing 256 intensity levels. In general, each color component is represented as a different image frame so that a full color image has three image frames, as shown in FIG. 1E. As discussed herein, according to the present teaching, when there are multiple bits representing each color component, the image data is re-organized so that corresponding color bits in different color components are stored together, as shown in FIGS. 4A and 4B. This is to facilitate the compression scheme, as shown in FIG. 4C, of the present teaching.

Figure 12A:
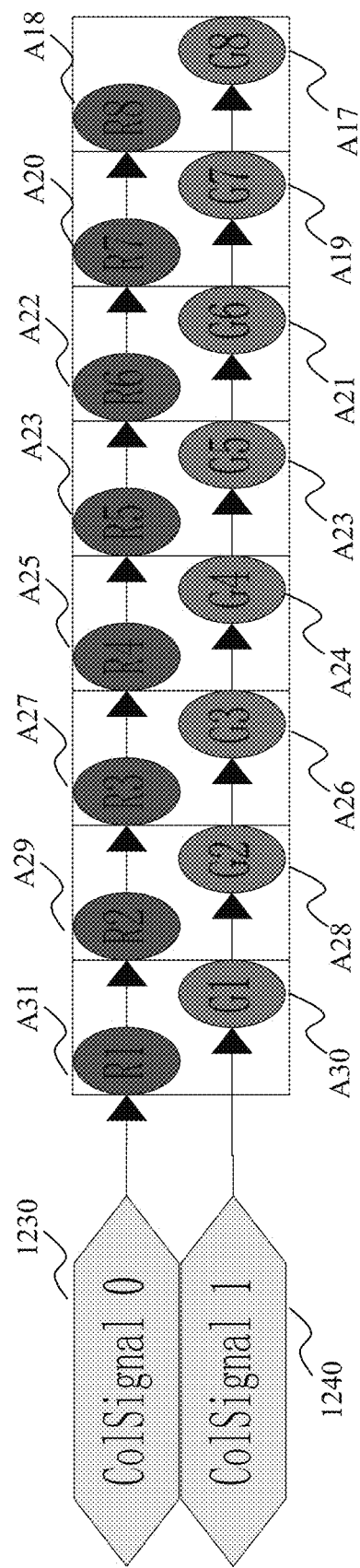
FIG. 12A shows a row of pixels in dual color where each color component being individually driven by a separate column signal, in accordance with an embodiment of the present teaching.
Figure 12B:
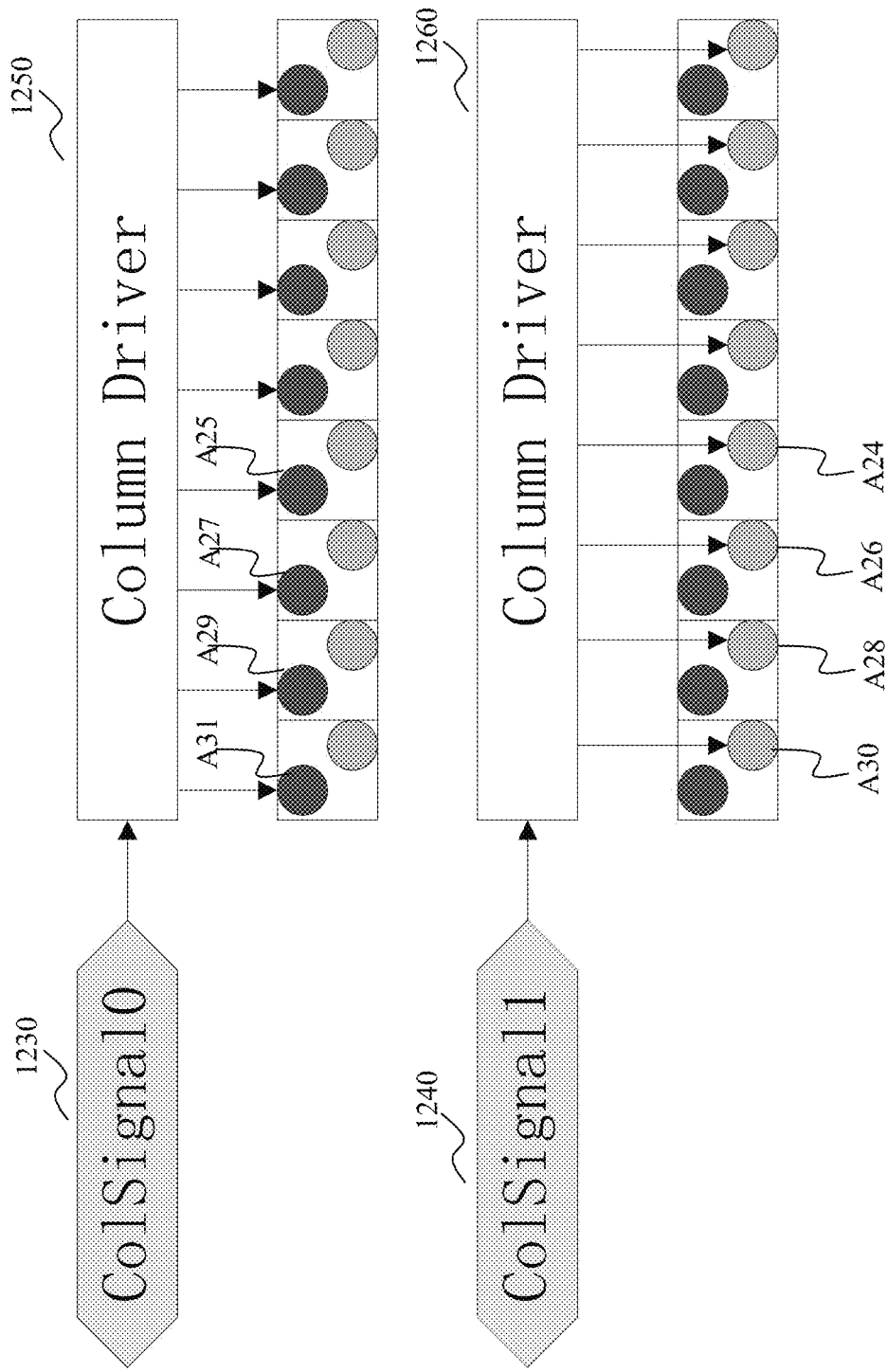
FIG. 12B shows that separate column drivers drive two respective color components of pixels in dual color, in accordance with an embodiment of the present teaching.

When there are more than a single color, the connection pattern may be more complex and how the image bits are to be sequenced also differ accordingly. FIG. 12A shows a row of pixels in dual color where each color light being individually driven by a separate column signal, in accordance with an embodiment of the present teaching. As illustrated, each pixel has two color lights, red and green. For example, the first pixel on the left has a red bit A31 and a green bit A30, the second pixel has a red bit A29 and a green bit A28, etc. In this illustration, all red lights are driven by a column signal 1230 and all green lights are driven by a different column signal 1240. FIG. 12B shows a different representation of the same connection pattern with separate column drivers 1250 and 1260 driving two respective color components of pixels, in accordance with an embodiment of the present teaching. As seen, column driver 1250 has various links for delivering column signal 1230 to red lights of a row of pixels, starting from the left most link sending signals to A31, A29, A27, A25, . . . . Column driver 1260 has various links for delivering column signal 1240 to green lights of a row of pixels, starting from the left most link sending signals to A30, A28, A26, A24, . . . . When lights for different colors are driven by separate column signals, the bits in the bit based image blocks may not need to be re-sequenced. However, usually, different colors of the pixels may be driven by the same column signal. In this case, a column signal used to drive different color components of the pixels needs to traverse different color lights and different pixels in a certain connection pattern.

Figure 13A:
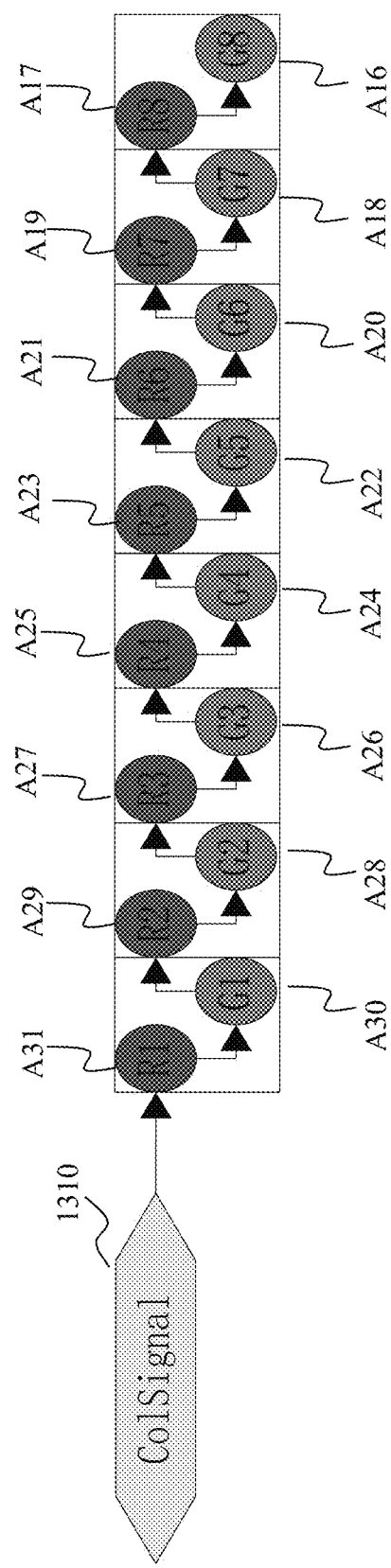
FIG. 13A shows a row of pixels in dual color having both color components driven by the same column signal via a snake type I connection, in accordance with an embodiment of the present teaching.
Figure 13B:
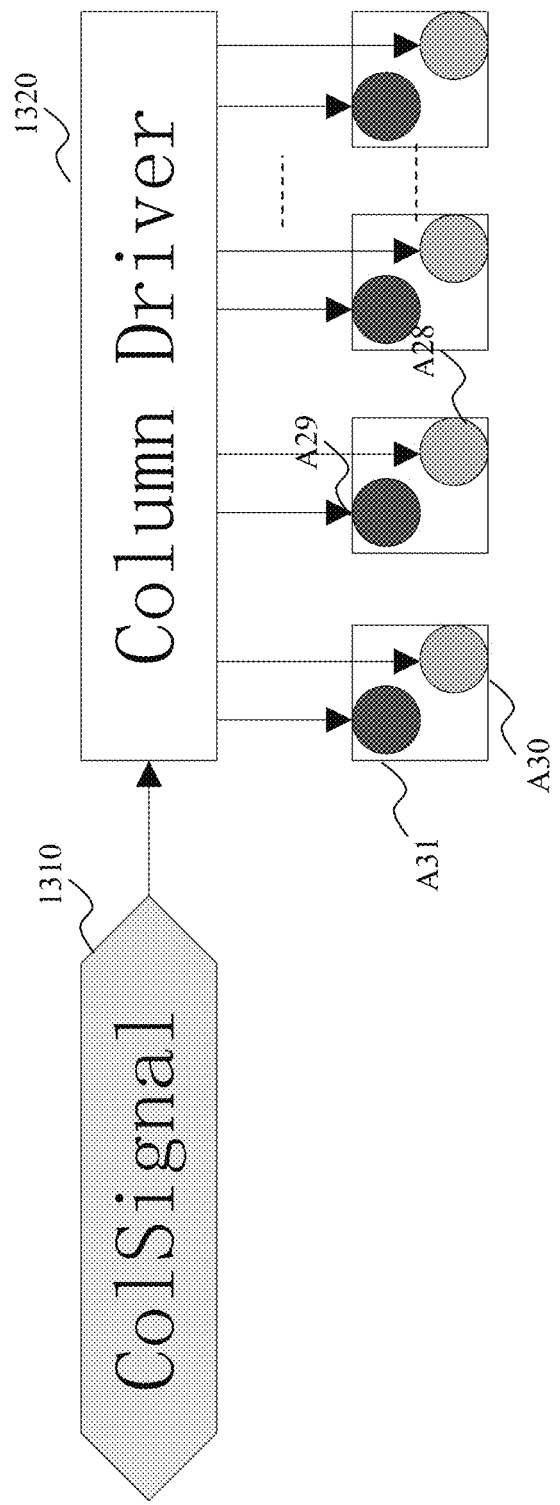
FIG. 13B shows a representation of a column driver driving both color components of a row of pixels in dual color via a snake type I connection, in accordance with an embodiment of the present teaching.

FIG. 13A shows how a column signal is used to drive both color components of pixels via a snake type I connection, in accordance with an embodiment of the present teaching. In this illustration, the same pixel row in dual color is provided with two corresponding color components, one being a row of red color of the pixels and the other being green color of the pixels. Different from FIG. 12A, a single column signal 1310 in FIG. 13A is used to drive both red and green lights of the pixels. Specifically, the column signal 1310 traverses all the red and green lights of pixel in 1220 in a snake type I connection pattern, i.e., first to A31 (red), then to A30 (green), A29 (red), A28 (green), A27 (red), A26 (green), . . . , A17 (red), and to A16 (green). FIG. 13B shows a representation of using a column driver 1320 to drive column signal 1310 through both color lights of all pixels in 1220 via a snake type I connection, in accordance with an embodiment of the present teaching. As seen, the various links from the column driver 1320 starting from the left most link send the column signal 1310 to all in the order of A31, A30, A29, A28, . . . , traversing both red and green lights of all pixels in the row.

Figures 13C, 13D:
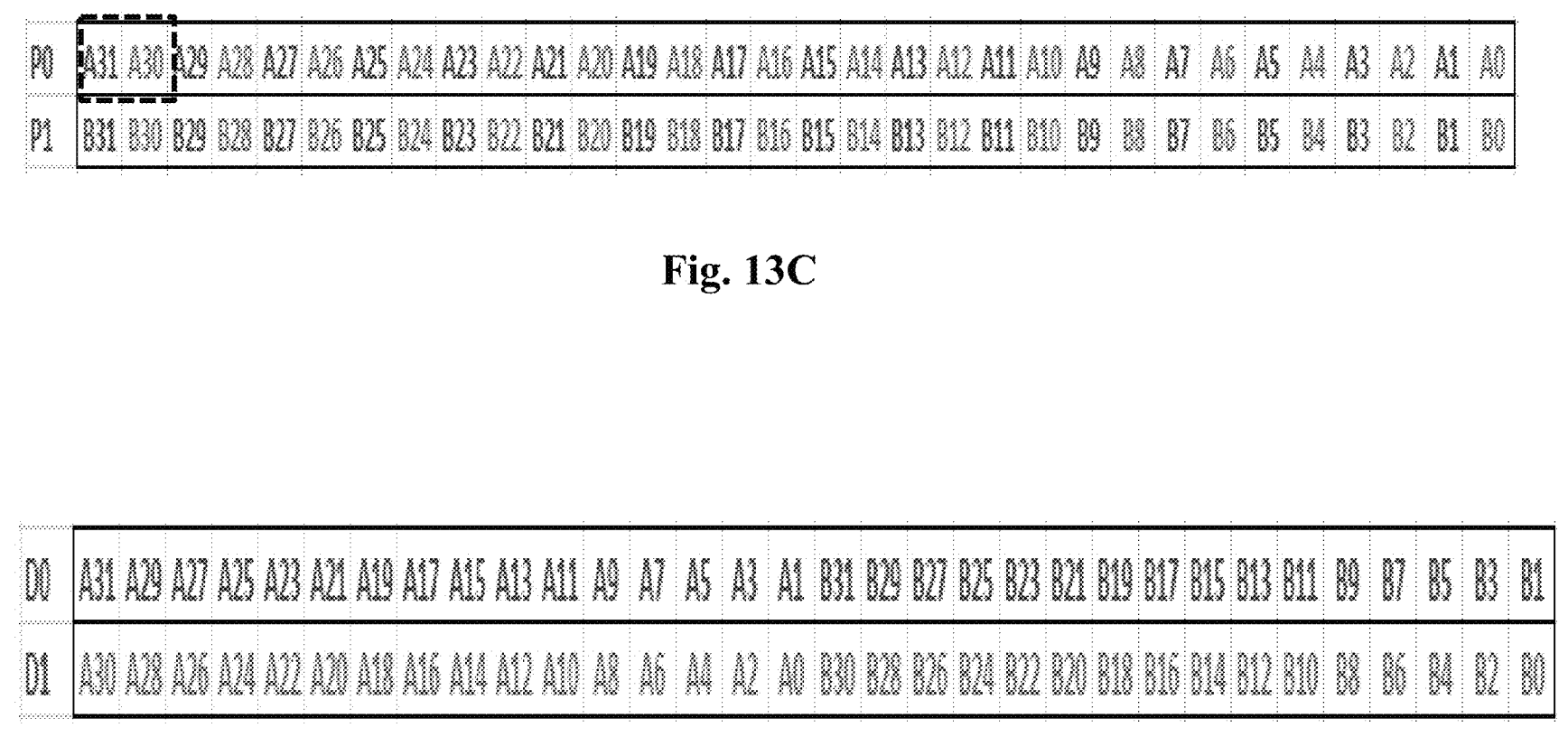

To facilitate driving pixels of dual color via snake type I connection pattern, bits in a bit based image block need to be re-sequenced. As discussed herein, for an image with dual color, a bit based image block retrieved from an alternate buffer has corresponding bits from both color stored together. For example, if each color is represented using 8 bits, then there will be 8 frames for the image. The first frame may store the least significant bits of red and green for each pixel. The second frame may store the second least significant bits of red and green for each pixel, . . . and the last frame may store the most significant bits of red and green for each pixel. FIG. 13C shows content in registers loaded from an alternate buffer 330 with pixels in dual color, in accordance with an embodiment of the present teaching. As discussed herein, A31 and A30 are red and green bits from red and green color components, respectively, for the first pixel. A29 and A28 are a bit from red and a corresponding bit from green, respectively, for the second pixel, etc.

To facilitate snake type I connection pattern, the bits as shown in FIG. 13C need to be re-sequenced. FIG. 13D shows the result of sequencing the bits in registers as shown in FIG. 13C with pixels in dual color to facilitate snake type I connection, in accordance with an embodiment of the present teaching. The re-sequenced bits are in the top row are now ordered as A31, A29, A27, A25, . . . , and the re-sequenced bits in the second row are now A30, A28, A26, A24, . . . so that when a column signal traverses in a snake type I connection pattern, it will achieve the traverse order of A31, A30, A29, A28, . . . , consistent with what is shown in FIG. 13A. If the connection pattern for pixels in dual color is snake type II, then a column signal used to drive both color component of all pixels in FIG. 13A will traverse in the order of A30, A31, A28, A29, . . . , (not shown). To accommodate the snake type II connection pattern for pixels in dual color, the color bits in FIG. 13C will be rearranged to produce bits in a first register in the order of A30, A28, A26, . . . and in the second row in a new order of A31, A29, A27, . . . so that when a column signal traverse in a snake type II connection, it will deliver the signal in the order of A30, A31, A28, A29, . . . (not shown). If the connection pattern is snake type III, then the order of re-arranged bits will be A31, A30, A28, A29, A27, A26, A24, A25, . . . (now shown).

As discussed herein, when the image bits loaded from the buffer 330 need to be re-arranged to accommodate the connection type of the LED display, there may be different ways to achieve the re-arrangement appropriate for the connection type. One is via sequencing performed by the image bits sequencer 720, as shown in FIG. 9D and FIG. 13D. Another way is to combine the use of the image bits sequencer 720 and the microcodes. The image bits sequencer 720 may be provided to sequence the image bits according to snake type I connection. If the actual connection type is snake type II or III, microcodes may be executed to rearrange the bits in snake type I arrangement to convert to bit orders for other connection types. For example, to convert from snake type I bit arrangement to snake type II arrangement, a simple operation of flipping the order of each pair of bits will achieve the conversion.

Figure 14A:
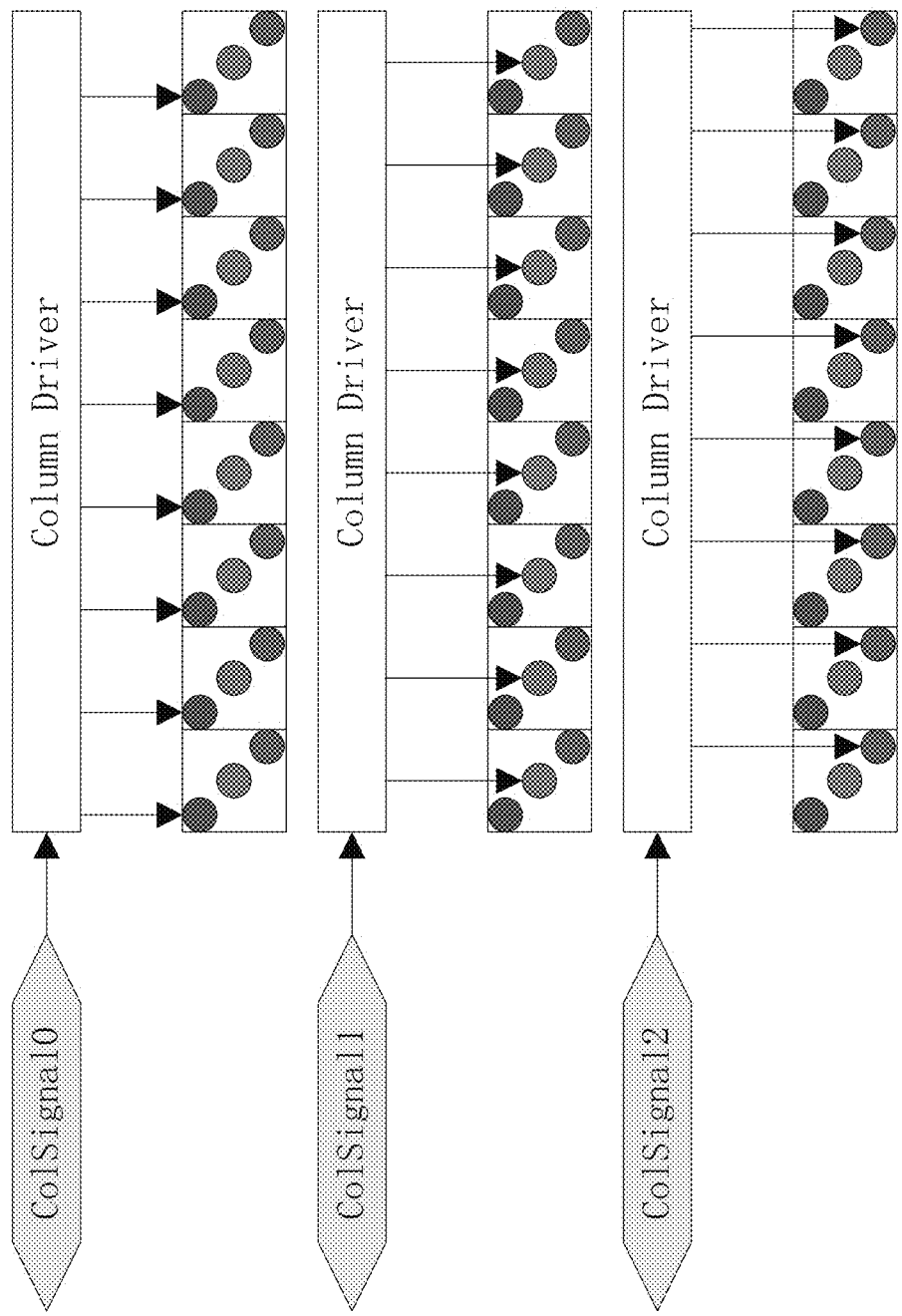
FIG. 14A shows a row of pixels in full color having each of the three color components driven by a separate column signal, in accordance with an embodiment of the present teaching.
Figure 14B:
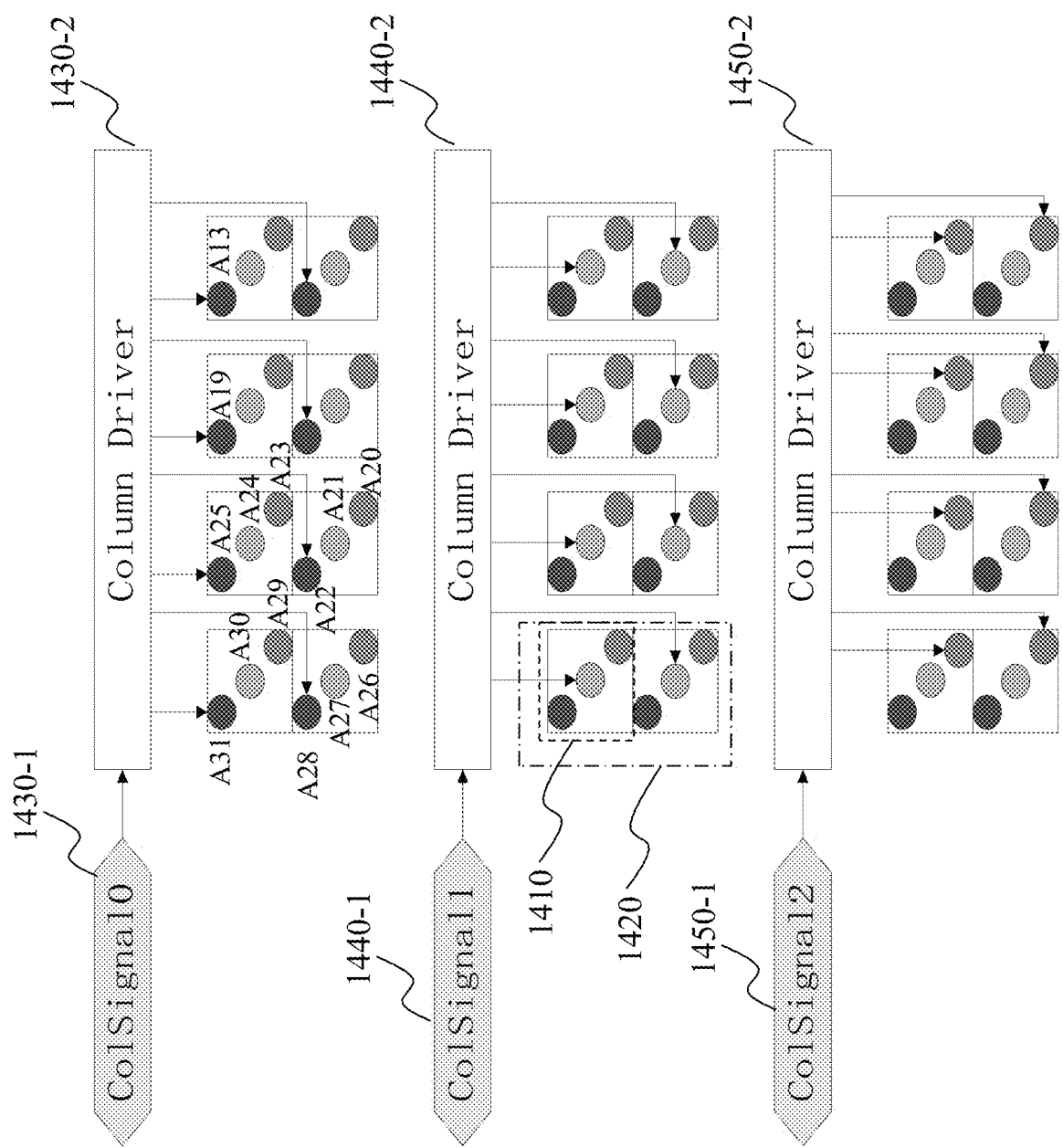
FIG. 14B is a representation of three column drivers each of which drives a corresponding color component of a row of pixels in full color, in accordance with an embodiment of the present teaching.

FIG. 14A shows a single row of pixels in full color with each of the three color components being driven by a separate column signal in a straight connection pattern, in accordance with an embodiment of the present teaching. As discussed herein, when the traverse cover a single color with a straight through connection in each color component, it requires no sequencing of the bits in a bit based image block. FIG. 14B shows snake type I connection across different rows of pixels in each color, in accordance with an embodiment of the present teaching. As illustrated, there are three column signals, each is used to drive a different color but across two rows of pixels according to snake type I traverse pattern. As marked therein, a pixel in a first row is 1410 and a corresponding pixel from a second row is 1420. Each of these pixels is stored with 3 color bits, red, green, and blue and they are arranged together. For example, a red bit A31, a green bit A30, and a blue bit A29 of the first pixel of the first row; a red bit A28, a green bit A27, and a blue bit A26 of the first pixel of the second row (stored with the first pixel of the first row). Additionally, the second pixel of the first row has bits A25 (red), A24 (green), and A23 (blue); the second pixel of the second row has bits A22 (red), A21 (green), and A20 (blue). A column signal 1430-1 for driving red bits of pixels in a snake type I connection (across rows) is driven to the red lights by a column driver 1430-2. The column signal 1440-1 for driving green bits of pixels across rows in a snake type I connection is driven to the green lights by a column driver 1440-2. The column signal 1450-1 for driving blue bits of pixels across rows in a snake type I connection is driven to blue lights by a column driver 1450-2.

Figure 14C:
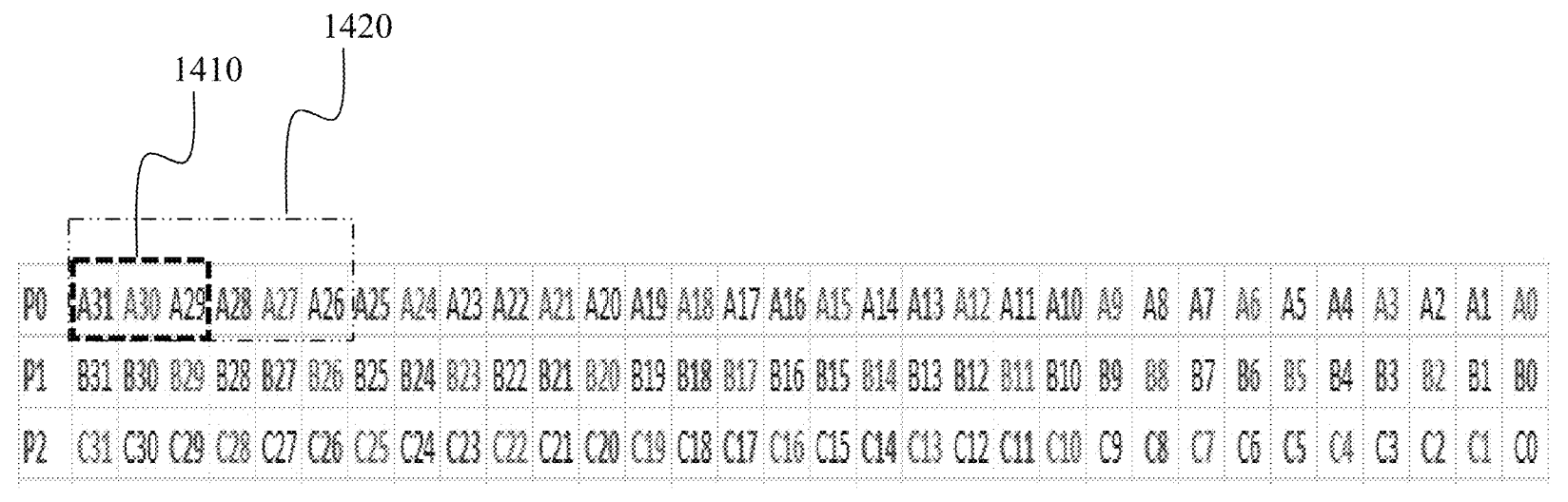
Figure 14D:
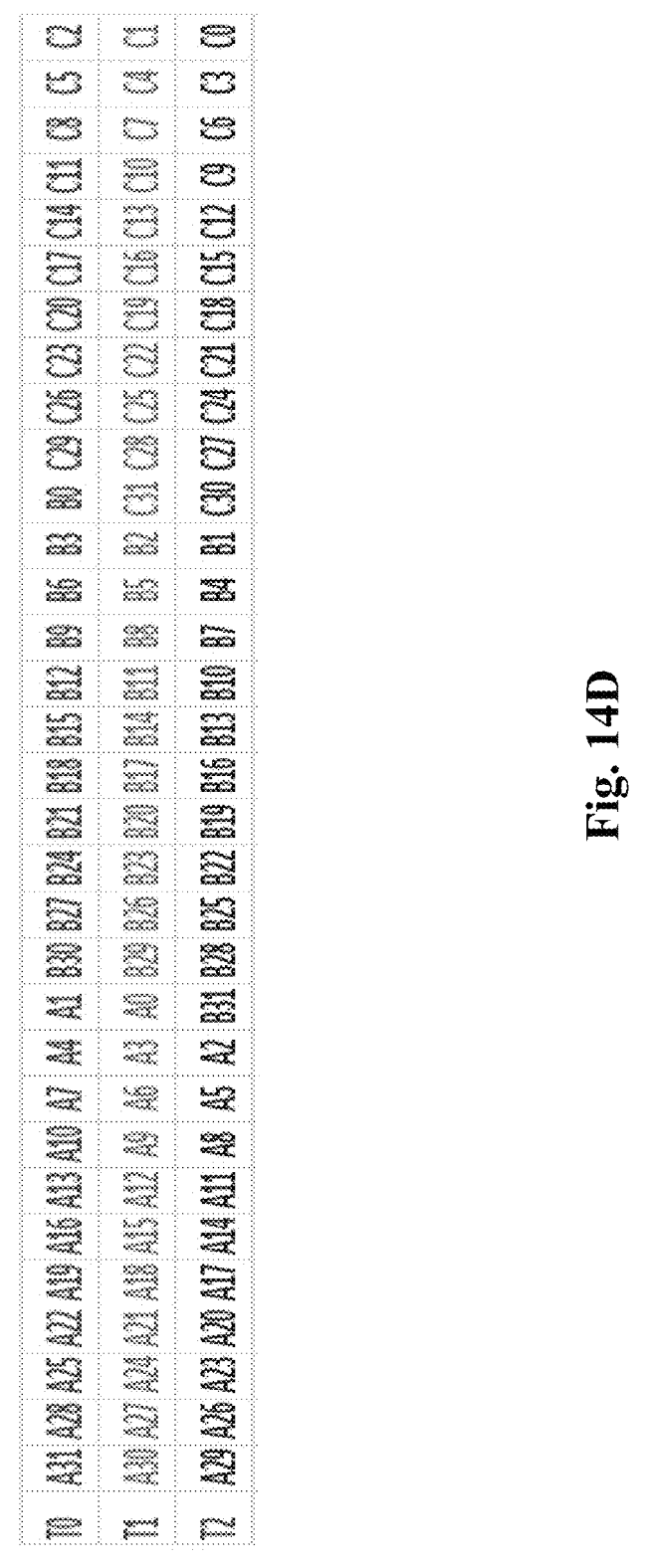

FIG. 14C shows content in registers with pixels from two rows are stored together in full color, in accordance with an embodiment of the present teaching. As seen, the first three bits A31, A30, and A29 correspond to red, green, and blue bits of the first pixel from the first row 1410, the next three bits A28, A27, and A26 correspond to red, green, and blue bits of the first pixel from the second row and together it corresponds to 1420. FIG. 14D shows the result of sequencing these color bits of pixels to facilitate driving each color component separately across different rows in snake type I connection pattern, in accordance with an embodiment of the present teaching. As can be seen, through sequencing operation, the red, green, and blue bits of different pixels are now arranged in such a way that bits in each color are driven across different rows in a way consistent with snake type I connection pattern. For example, in the red color, the column signal 1430-1 goes through A31 (red of the first pixel from the first row), A28 (red of the first pixel from the second row), A25 (red of the second pixel of the first row), A22 (red of the second pixel from the second row), A19 (red of the third pixel from the first row), A16 (red of the third pixel from the second row), . . . etc. Similarly, in the green color, the column signal 1440-1 goes through A30 (green of the first pixel from the first row), A27 (green of the first pixel from the second row), A24 (green of the second pixel of the first row), A21 (green of the second pixel from the second row), A18 (green of the third pixel from the first row), A15 (green of the third pixel from the second row), . . . etc. With regard to blue color, the column signal 1450-1 is driven through A29 (blue of the first pixel from the first row), A26 (blue of the first pixel from the second row), A23 (blue of the second pixel of the first row), A20 (blue of the second pixel from the second row), A17 (blue of the third pixel from the first row), A14 (blue of the third pixel from the second row), . . . etc.

FIG. 15A shows a representation of separately driving each color components of pixels in full color separately in snake type II connection, in accordance with an embodiment of the present teaching. As illustrated, the data is organized the same way as what is shown in FIG. 14B, except that the connection type is snake type II, in which, instead of starting with the pixel in the first row, it starts from the pixel of the second row and then zig zag between the first and second rows. FIG. 15B shows the result of sequencing the bits in registers as shown in FIG. 14C with pixels in full color to facilitate driving color bits in a snake type II connections, in accordance with an embodiment of the present teaching. As discussed herein, this may be achieved via different means. As shown previously, one is via sequencing performed by the image bits sequencer 720. Another way is to combine the use of the image bits sequencer 720 and the microcodes. The image bits sequencer 720 may be provided to sequence the image bits according to snake type I connection. If the actual connection type is snake type II or III, microcodes may be executed to rearrange the bits in snake type I arrangement to convert to bit orders for other connection types. As shown above, to convert from snake type I bit arrangement to snake type II arrangement, a simple operation of flipping the order of each pair of bits will achieve the conversion.

The above various examples show how to sequence bits in bit based image data in order to accommodate different connection types used to link different pixels in an LED display screen. As shown in FIG. 7, sequencing operation is performed by the image bits sequencer 720. As discussed herein, depending on the connection of each LED display screen, the information related to the connection type may be configured in the connection profile 740 and is made available to the image bits sequencer 720. As discussed herein, based on the information about the connection type, the image bits sequencer 720 may then activate the appropriate microcodes stored in 730 to perform the bit sequencing. Thus, the refresh processor 340 is capable of adapting to different LED display screens that connect LED unit panels in different ways. The re-sequenced image bits are then sent to the special buffer 750, which then sends such image content, on a first in first out order, to the LED refresh unit 760. Based on such appropriately sequenced image bits, the LED refresh unit 760 transforms the image content into different control signals to be used to control how the lights associated with pixels in the LED panels 770 are refreshed in order to deliver the visual effect of the image content.

FIG. 16 is a flowchart of an exemplary process of the refresh processor 340, in accordance with an embodiment of the present teaching. Similar to the data transfer unit 320, the refresh processor 340 may also operate in two different phases. In the first phase, the refresh processor 340 is to be configured handle an LED display screen with a certain connection type. This is for deploying microcodes appropriate for the specific connection type in hand. The second phase is an online phase to display image content on the LED display screen based on the bit based image data stored in alternate buffers 330-1 and 330-2.

In FIG. 16, steps 1600 and 1610 are for the phase one, in which information stored in 740 on connection type is accessed at 1600 and appropriate microcodes for the specified connection type are loaded at 1610. The rest of the steps form a loop to traverse the entire image for displaying image content on an LED screen. As discussed herein, during the online phase of displaying image content on an LED display screen, the refresh processor 340 syncs its operation with the data transfer unit 320 based on the commonly shared clock signal CLK. In this process, upon receiving a next clock signal at 1620, the image bits sequencer 720 accesses, at 1630, the buffer pointer in order to retrieve, at 1640, the next bit based image block from one of the alternate buffers pointed to by the buffer pointer. The image bits sequencer 720 then executes, at 1650, the loaded microcodes suitable for the current connection type to sequence the image bits in the loaded bit based image block. The re-sequenced image bits are then stored, at 1660, to the special buffer 750, from where they can be accessed by the LED refresh unit 760, at 1670, to generate, at 1680, various refreshing control signals according to the image content. Such generated control signals are then used by the LED refresh unit 760 to refresh, at 1690, the lights on the LED panels.

As disclosed herein, the LED display framework according to the present teaching organizes bits in an image in a way to maximize the processing speed, minimizes required memory resources, and capable of adapting to LED display screens that adopt different connection types. These characteristics of the present teaching effectively address and remedy the deficiencies of the traditional solutions in LED display.

Figure 17:
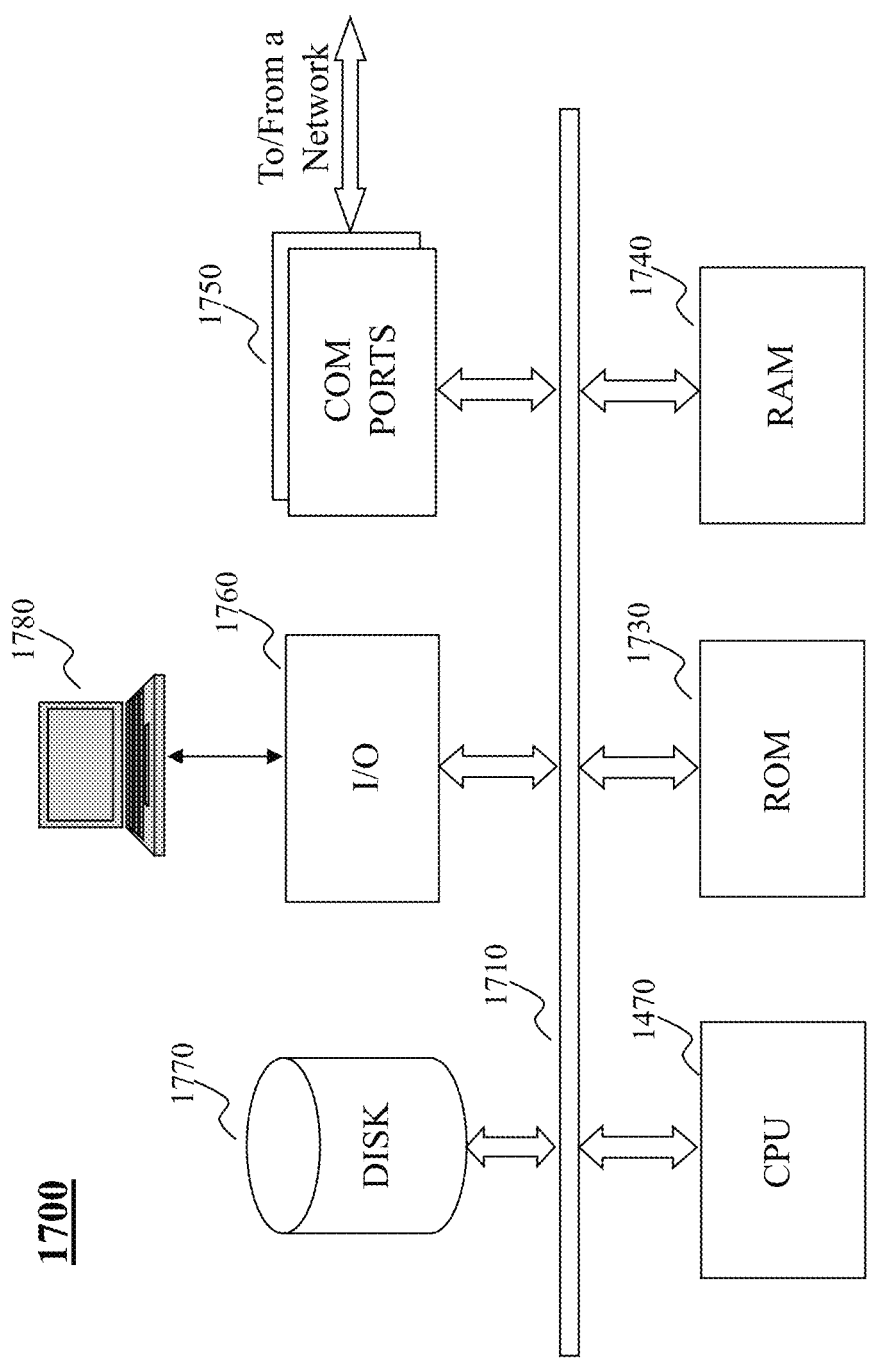
FIG. 17 is an illustrative diagram of an exemplary computing device architecture that may be used to realize a specialized system implementing the present teaching in accordance with various embodiments.

FIG. 17 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1700 may be used to implement any component of various components, as described herein. For example, the data transfer unit 320 and/or the refresh processor 340 may be implemented on a computer such as computer 1700, via its hardware, software program, firmware, or a combination thereof. Although only one such computer is shown, for convenience, the computer functions relating to the LED display system as described herein may be implemented in a distributed fashion on a number of similar platforms, to distribute the processing load.

Computer 1700, for example, includes COM ports 1750 connected to and from a network connected thereto to facilitate data communications. Computer 1700 also includes a central processing unit (CPU) 1720, in the form of one or more processors, for executing program instructions. The exemplary computer platform includes an internal communication bus 1710, program storage and data storage of different forms (e.g., disk 1770, read only memory (ROM) 1730, or random access memory (RAM) 1740), for various data files to be processed and/or communicated by computer 1700, as well as possibly program instructions to be executed by CPU 1720. Computer 1700 also includes an I/O component 1760, supporting input/output flows between the computer and other components therein such as user interface elements 1780. Computer 1700 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for data transfer in LED display, the method comprising:
   receiving, at a data transfer unit, a signal signaling a timing for a next data transfer;
   in response to the signal:
      obtaining, at the data transfer unit, a next data transfer instruction instructing the data transfer unit to transfer a bit-based image block of an image from a memory,
      transferring, according to the next data transfer instruction, the bit-based image block from the memory, via a bus connected thereto, to one of a pair of alternate buffers pointed to by a write buffer pointer, the pair of alternate buffers electrically connected to the data transfer unit and a refresh processor, and
      toggling the write buffer pointer to point to another of the pair of alternate buffers; and
   repeating the steps of receiving, obtaining, transferring, and toggling, wherein bit-based image blocks transferred to the pair of alternate buffers are:
      sequenced by a connection-based sequencer based on how unit panels within the LED display are connected, resulting in a connection-based sequence,
      stored, as the connection-based sequence, in a special buffer between the connection-based sequencer and the LED display, and
      displayed, using the connection-based sequence, on the LED display.

2. The method of claim 1, wherein the signal is one of a handshake signal or a clock signal.

3. The method of claim 1, further comprising sending, after the step of transferring, a handshake signal to indicate completion of transferring the bit-based image block.

4. The method of claim 1, wherein the data transfer instruction includes an address representing a starting address in the memory where the bit-based image block is stored and a length of the bit-based image block.

5. The method of claim 4, further comprising mapping the address on to the bus.

6. The method of claim 1, wherein the bit-based image block comprises multiple pixels, each of which has one or more color bits, wherein each of the one or more bits is a corresponding bit of a representation of a respective color.

7. The method of claim 1, further comprising generating a plurality of data transfer instructions for the image by:
   partitioning the image with a plurality of pixels into different image blocks, the image having one or more frames, each of which represents a respective color; and
   converting each of the image blocks into a corresponding bit-based image with each of its pixels having one or more color bit from a corresponding representation of a respective color; and
   for each of the bit-based image blocks,
      storing in the memory with a starting address and a length of the bit-based image block, and
      generating a data transfer instruction for reading the bit-based image block with the starting address and the length incorporated therein.

8. Machine readable and non-transitory medium having information recorded thereon for data transfer in LED display, wherein the information, when read by the machine, causes the machine to perform:
   receiving, at a data transfer unit, a signal signaling a timing for a next data transfer;
   in response to the signal:
      obtaining, at the data transfer unit, a next data transfer instruction instructing the data transfer unit to transfer a bit-based image block of an image from a memory,
      transferring, based on the next data transfer instruction, the bit-based image block from the memory, via a bus connected thereto, to one of a pair of alternate buffers pointed to by a write buffer pointer, the pair of alternate buffers electrically connecting to the data transfer unit and a refresh processor, and
      toggling the write buffer pointer to point to another of the pair of alternate buffers; and
   repeating the steps of receiving, obtaining, transferring, and toggling, wherein bit-based image blocks transferred to the pair of alternate buffers are:
      sequenced by a connection-based sequencer based on how unit panels within the LED display are connected, resulting in a connection-based sequence,
      stored, as the connection-based sequence, in a special buffer between the connection-based sequencer and the LED display, and
      displayed, using the connection-based sequence, on the LED display.

9. The medium of claim 8, wherein the signal is one of a handshake signal or a clock signal.

10. The medium of claim 8, the information, when read by the machine, further causes the machine to perform sending, after the step of transferring, a handshake signal to indicate completion of transferring the bit-based image block.

11. The medium of claim 8, wherein the data transfer instruction includes an address representing a starting address in the memory where the bit-based image block is stored and a length of the bit-based image block.

12. The medium of claim 11, wherein the information, when read by the machine, further causes the machine to perform mapping the address on to the bus.

13. The medium of claim 8, wherein the bit-based image block comprises multiple pixels, each of which has one or more color bits, wherein each of the one or more bits is a corresponding bit of a representation of a respective color.

14. The medium of claim 8, wherein the information, when read by the machine, further causes the machine to perform generating a plurality of data transfer instructions for the image by:
   partitioning the image with a plurality of pixels into different image blocks, the image having one or more frames, each of which represents a respective color; and
   converting each of the image blocks into a corresponding bit-based image with each of its pixels having one or more color bit from a corresponding representation of a respective color; and
   for each of the bit-based image blocks,
      storing in the memory with a starting address and a length of the bit-based image block, and generating a data transfer instruction for reading the bit-based image block with the starting address and the length incorporated therein.

15. A system for data transfer in LED display, comprising:
a bitCopy instruction generator configured for generating a plurality of data transfer instructions, each of which instructing reading a bit-based image block of an image from a memory; and
a bitCopy unit configured for:
receiving a signal signaling a timing for a next data transfer,
in response to the signal,
obtaining a next data transfer instruction for reading a next bit-based image block of the image from the memory,
transferring, based on the next data transfer instruction, the next bit-based image block from the memory, via a bus connected thereto, to one of a pair of alternate buffers pointed to by a write buffer pointer, the pair of alternate buffers electrically connected to the bitCopy unit and a refresh processor,
toggling the write buffer pointer to point to another of the pair of alternate buffers, and
repeating the steps of receiving, obtaining, transferring, and toggling, wherein
bit-based image blocks transferred to the pair of alternate buffers are:
sequenced by a connection-based sequencer based on how unit panels within the LED display are connected, resulting in a connection-based sequence,
stored, as the connection-based sequence, in a special buffer between the connection-based sequencer and the LED display, and
displayed, using the connection-based sequence, on the LED display.

16. The system of claim 15, wherein the signal is one of a handshake signal or a clock signal.

17. The system of claim 15, wherein the bitCopy unit is further configured for sending, after the step of transferring, a handshake signal to indicate completion of transferring the bit-based image block.

18. The system of claim 15, wherein the data transfer instruction includes an address representing a starting address in the memory where the bit-based image block is stored and a length of the bit-based image block.

19. The system of claim 15, wherein the bit-based image block comprises multiple pixels, each of which has one or more color bits, wherein each of the one or more bits is a corresponding bit of a representation of a respective color.

20. The system of claim 15, further comprising:
an image data partition unit configured for partitioning the image with a plurality of pixels into different image blocks, the image having one or more frames, each of which represents a respective color; and
an image preprocessing unit configured for
converting each of the image blocks into a corresponding bit-based image with each of its pixels having one or more color bit from a corresponding representation of a respective color, and
storing each of the bit-based image blocks in the memory with a starting address and a length of the bit-based image block; and
the bit-Copy instruction generator is further configured for generating a data transfer instruction for reading each of the bit-based image blocks having a corresponding starting address and a length incorporated therein.

* * * * *